(12) United States Patent
Yamada et al.

(10) Patent No.: US 11,133,880 B2
(45) Date of Patent: Sep. 28, 2021

(54) COMPUTER SYSTEM, METHOD FOR ESTIMATING RADIO WAVE PROPAGATION CHARACTERISTIC IN SPACE, AND COMPUTER

(71) Applicant: HITACHI, LTD., Tokyo (JP)

(72) Inventors: Hiroki Yamada, Tokyo (JP); Yuichi Igarashi, Tokyo (JP); Kenzaburo Fujishima, Tokyo (JP); Takashi Yano, Tokyo (JP); Masami Oonishi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/744,891

(22) Filed: Jan. 16, 2020

(65) Prior Publication Data

US 2020/0235835 A1 Jul. 23, 2020

(30) Foreign Application Priority Data

Jan. 21, 2019 (JP) .............................. JP2019-007717

(51) Int. Cl.
*H04W 40/00* (2009.01)
*H04B 17/391* (2015.01)
(Continued)

(52) U.S. Cl.
CPC ......... *H04B 17/391* (2015.01); *H04B 17/318* (2015.01); *H04W 16/18* (2013.01); *H04W 64/003* (2013.01)

(58) Field of Classification Search
None
See application file for complete search history.

(56) References Cited

U.S. PATENT DOCUMENTS

| 2011/0281526 A1* | 11/2011 | Matsuda | H04W 16/18 |
| | | | 455/67.11 |
| 2012/0027068 A1* | 2/2012 | Motoyoshi | H04B 17/309 |
| | | | 375/224 |

(Continued)

FOREIGN PATENT DOCUMENTS

| JP | 2014-158110 A | 8/2014 |
| JP | 2015-80061 A | 4/2015 |

OTHER PUBLICATIONS

Lundberg, Scott M.; Lee, Su-In. A unified approach to interpreting model predictions. In: Advances in Neural Information Processing Systems. 2017, p. 4768-4777.

*Primary Examiner* — Jinsong Hu
*Assistant Examiner* — Alexander J Yi
(74) *Attorney, Agent, or Firm* — Volpe Koenig

(57) ABSTRACT

A computer system, which estimates a radio wave propagation characteristic in a space where a wireless communication system using structure data and system data is constructed, includes a computer having a processor and a storage apparatus and holds feature parameter information, which stores an entry that associates a parameter included in structure data, that is, a feature parameter which greatly contributes to an estimation result of the radio wave propagation characteristic in the space with a type of the space. When receiving a request for estimation of a radio wave propagation characteristic in a target space, the processor retrieves an entry associated with a type of the target space from the feature parameter information, and presents an interface to input a value of the feature parameter included in the retrieved entry as estimation structure data and an interface to input estimation system data.

9 Claims, 19 Drawing Sheets

(51) Int. Cl.
    *H04B 17/318*    (2015.01)
    *H04W 64/00*     (2009.01)
    *H04W 16/18*     (2009.01)

(56) References Cited

U.S. PATENT DOCUMENTS

2012/0269081 A1* 10/2012 Ho .................. H04W 24/02
                                                                               370/252
2014/0114635 A1* 4/2014 Sato ................. H04W 16/18
                                                                               703/13

* cited by examiner

FIG. 5

| ID | STRUCTURE TYPE | FEATURE PARAMETER | | | | | | |
|---|---|---|---|---|---|---|---|---|
| | | 1 | 2 | 3 | 4 | 5 | 6 | 7 |
| 1 | TUNNEL (STRAIGHT LINE) | CROSS-SECTIONAL SHAPE | LENGTH | WIDTH | HEIGHT | - | - | - |
| 2 | TUNNEL (CURVE) | CROSS-SECTIONAL SHAPE | CURVE RADIUS | LENGTH | WIDTH | HEIGHT | RADIUS | ANGLE |
| 3 | ELEVATOR (RECTANGLE) | LENGTH | WIDTH | HEIGHT | - | - | - | - |
| ... | ... | ... | ... | ... | ... | ... | ... | ... |

FIG. 10

SYSTEM DATA INPUT SCREEN

1001 FREQUENCY: [ ] MHz
1002 OUTPUT POWER: [ ] dBm
1003 POLARIZATION: [VERTICAL ▼]
1004 ANTENNA: [DIPOLE ▼]
1005 Tx COORDINATE: [MANUAL ▼]
1006 [1] (x: [ ] m, y: [ ] m, z: [ ] m)
1007 [ADD]
1008 Rx COORDINATE: [MANUAL ▼]
1009 [1] (x: [ ] m, y: [ ] m, z: [ ] m)
1010 [ADD]
1011 [CONFIRM]

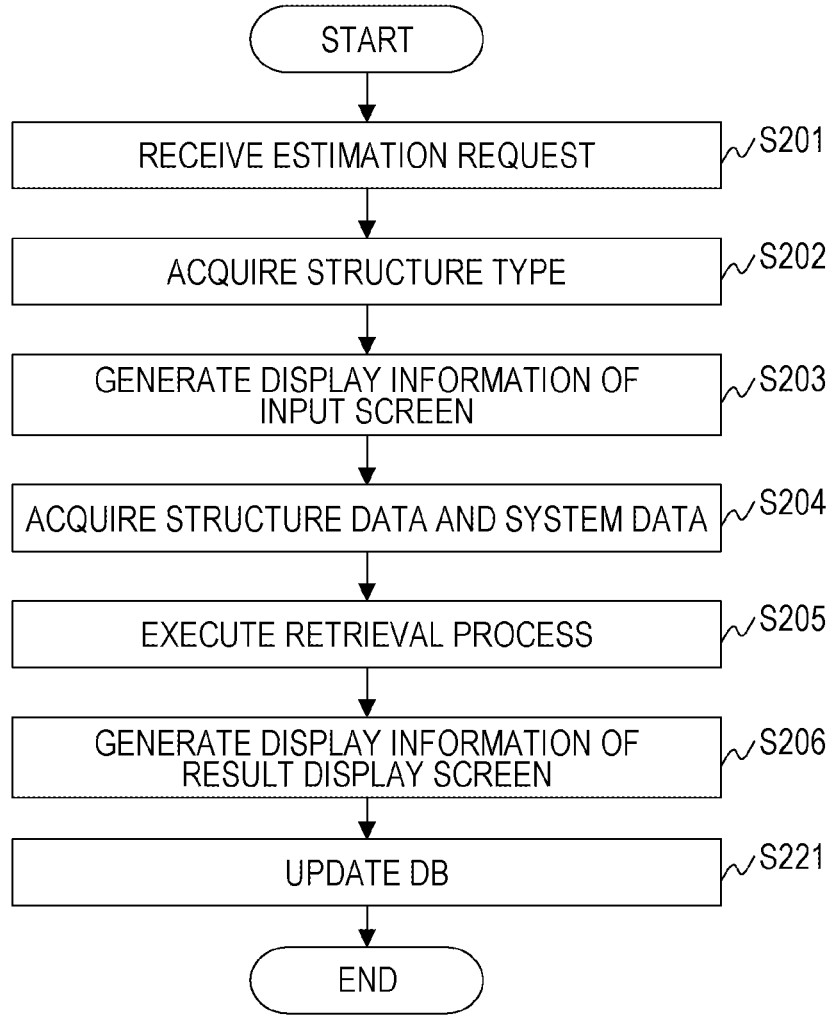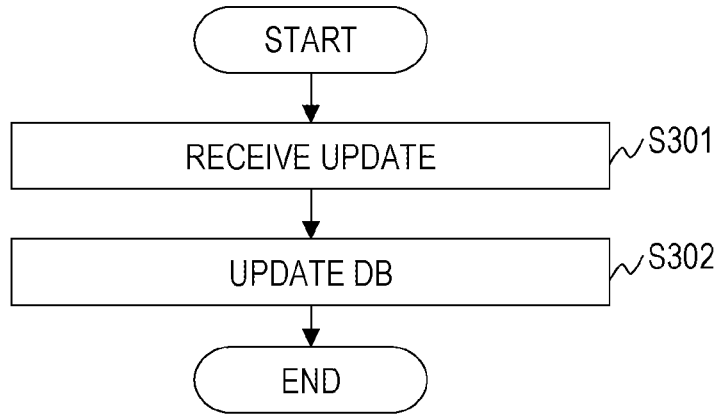

COMPUTER SYSTEM, METHOD FOR ESTIMATING RADIO WAVE PROPAGATION CHARACTERISTIC IN SPACE, AND COMPUTER

CLAIM OF PRIORITY

The present application claims priority from Japanese patent application JP 2019-007717 filed on Jan. 21, 2019, the content of which is hereby incorporated by reference into this application.

BACKGROUND OF THE INVENTION

1. Field of the Invention

The present invention relates to a system and a method for estimating a radio wave propagation characteristic in a space in wireless communication.

2. Description of the Related Art

In recent years, as wireless communication techniques have been widely used, there is a trend to introduce wireless communication systems used for outdoor mobile communication such as a cellular phone, to indoors. For example, realization of high-speed data communication at home and in office and utilization to sensor networks used in factories, power plants, tunnels, and elevators are expected for wireless communication systems using wireless standards, such as wireless local area network (LAN), Bluetooth (registered trademark, same hereinafter), and zigbee (registered trademark, same hereinafter).

When introducing the wireless communication system, it is necessary to set an arrangement of base stations in order to set appropriate communication areas. In a station arrangement design, the base station arrangement is determined such that a wide range of communication area can be covered with a small number of base stations based on a radio wave propagation characteristic in a target space where the wireless communication system is constructed. Therefore, a technique of estimating the radio wave propagation characteristic in the target space is important.

As the technique of estimating the radio wave propagation characteristic in the target space, techniques described in JP 2014-158110 A and JP 2015-80061 A are known.

JP 2014-158110 A discloses an apparatus "including: a terrain database in which terrain data is stored in advance; propagation path setting means for defining a plurality of rectangular planes, which has a line segment connecting a transmission point and a reception point as one side, around the line segment, defining a terrain profile along terrain between the transmission point and the reception point based on the terrain data on each plane of the defined planes, and setting a propagation path for each of the defined terrain profiles; propagation loss calculation means for calculating a propagation loss for each of the propagation paths; and propagation loss output means for outputting a propagation loss value between the transmission point and the reception point based on the propagation loss calculated for each of the propagation paths".

JP 2015-80061 A discloses a system in which "image data obtained by capturing a target area from a plurality of directions with a digital camera is generated. An image processing apparatus extracts a feature of a structure in the target area based on the image data and a capturing condition to obtain structure feature data. An analytical numerical model creation device generates numerical model data from the structure feature data. A reception power analysis apparatus performs electromagnetic field analysis on the numerical model data based on a radio condition, and outputs reception power of the radio as a calculation result, and a display displays the calculation result."

SUMMARY OF THE INVENTION

Since there are many structures unique to a building in an indoor facility where a wireless communication system is introduced, it is difficult to acquire detailed structure information in advance. Therefore, the technique of JP 2014-158110 A is not available when it is difficult to obtain the detailed structure information.

Further, in the technique described in JP 2015-80061 A, the estimation accuracy decreases when it is difficult to acquire a high-quality image due to a capturing environment and camera performance. The technique described in JP 2015-80061 A is not available in the first place when it is difficult to acquire the image.

An object of the present invention is to provide a system and method for estimating a radio wave propagation characteristic in a target space without using detailed structure information or an image.

A typical example of the invention disclosed in the present application is as follows. That is, a computer system estimates a radio wave propagation characteristic in a space where a wireless communication system using structure data and system data is constructed. The structure data is configured using parameter values indicating a type and a structure characteristic of the space. The system data is configured using a value relating to a design of the wireless communication system. The computer system includes at least one computer, which has a processor, a storage apparatus connected to the processor, and a communication device connected to the processor, and holds feature parameter information, which stores an entry that associates a parameter included in the structure data, that is, a feature parameter which greatly contributes to an estimation result of the radio wave propagation characteristic in the space with a type of the space. The processor acquires a type of the target space when receiving a request for estimation of a radio wave propagation characteristic in the target space, retrieves an entry associated with the type of the target space from the feature parameter information, presents a first interface to input a value of a characteristic parameter included in the retrieved entry as estimation structure data and a second interface to input estimation system data, and estimates the radio wave propagation characteristic in the target space using the estimation structure data and the estimation system data.

According to the invention, the radio wave propagation characteristic in the target space can be estimated without using the detailed structure information or the image. Other objects, configurations, and effects which have not been described above become apparent from embodiments to be described hereinafter.

BRIEF DESCRIPTION OF THE DRAWINGS

FIG. 5 is a table illustrating an example of a data structure of feature parameter information according to the first embodiment;

FIG. 10 is a view illustrating an example of a system data input screen displayed by the input/output apparatus according to the first embodiment;

FIG. 18 is a flowchart illustrating a radio wave propagation characteristic estimation process executed by the radio wave propagation characteristic estimation apparatus according to the third embodiment; and FIG. 19 is a flowchart illustrating a database update process executed by the radio wave propagation characteristic estimation apparatus according to the third embodiment.

DESCRIPTION OF THE PREFERRED EMBODIMENTS

Hereinafter, embodiments of the present invention will be described with reference to the drawings. However, the present invention is not construed as being limited to the description of the embodiments to be described below. Those skilled in the art can easily understand that specific configurations can be changed without departing from the spirit or gist of the present invention.

In the configurations of the invention to be described hereinafter, the same or similar configurations or functions will be denoted by the same reference signs, and redundant descriptions will be omitted.

The notations such as "first", "second", and "third" in the present specification are given to identify components, and do not necessarily limit the number or order.

First Embodiment

Figure 1:
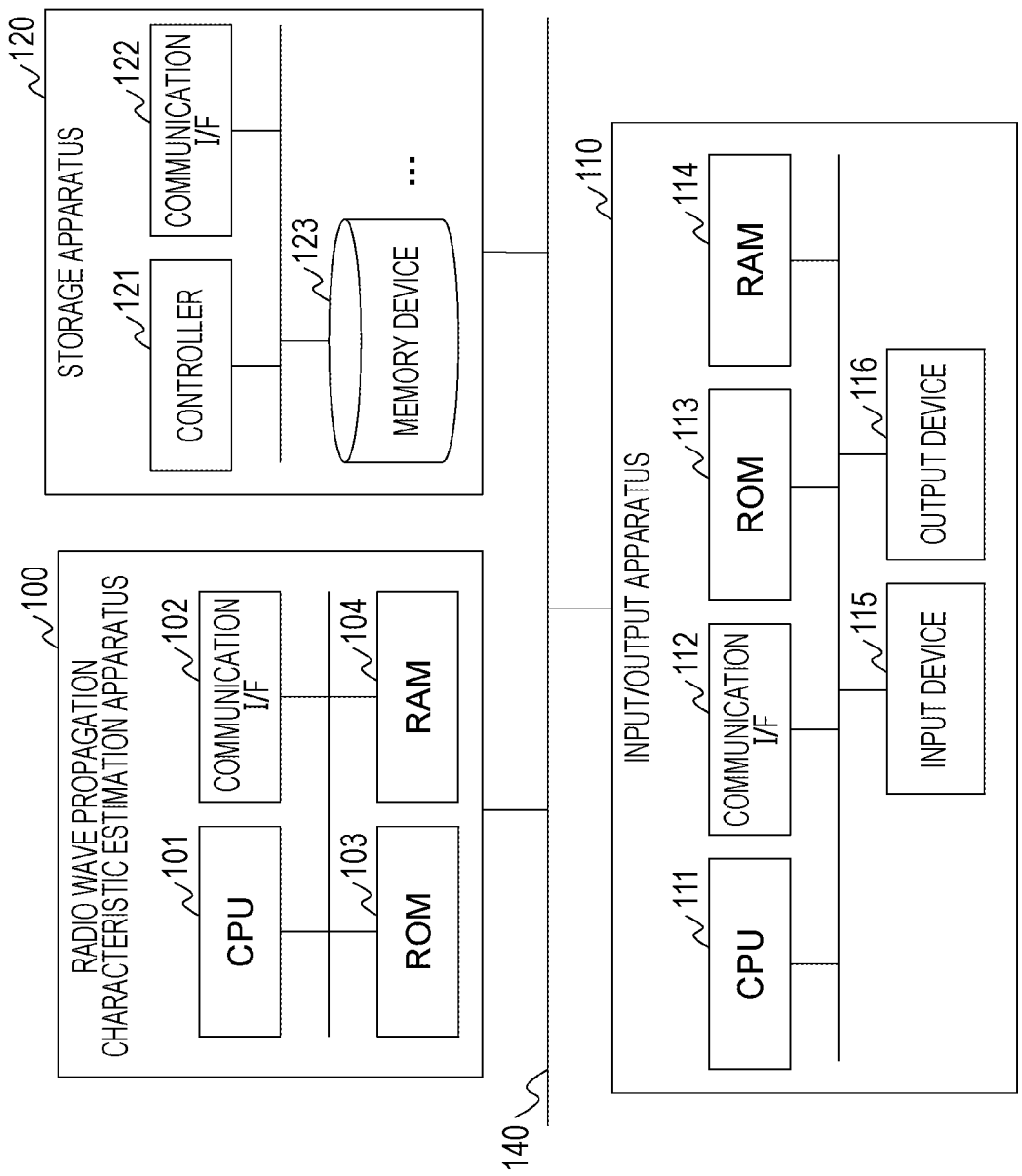
FIG. 1 is a diagram illustrating an example of a system configuration of a radio wave propagation characteristic estimation system according to a first embodiment.

FIG. 1 is a diagram illustrating an example of a system configuration of a radio wave propagation characteristic estimation system according to a first embodiment.

The radio wave propagation characteristic estimation system includes a radio wave propagation characteristic estimation apparatus 100, an input/output apparatus 110, and a storage apparatus 120.

The respective apparatuses are connected via a network 140. The network 140 is, for example, a local area network (LAN) and a wide area network (WAN). The present invention is not limited by a type and a connection scheme of the network 140. Incidentally, networks connecting the respective apparatuses may be different.

The radio wave propagation characteristic estimation apparatus 100 estimates a radio wave propagation characteristic in a target space based on information input from the input/output apparatus 110 and information stored in the storage apparatus 120. The radio wave propagation characteristic estimation apparatus 100 includes a CPU 101, a communication interface 102, a ROM 103, and a RAM 104. Each hardware is mutually connected via a bus.

The CPU 101 is an arithmetic device that executes a program. The CPU 101 executes processing according to the program to operate as a functional unit (module) that realizes a specific function. In the following description, processing described with a functional unit as a subject indicates that the CPU 101 is executing a program that realizes the functional unit.

The communication interface 102 is an interface configured to communicate with other apparatuses via the network 140. The communication interface 102 is configured using, for example, a network interface card (NIC).

The ROM 103 is a memory device that stores a program to be executed by the CPU 101. The ROM 103 according to the first embodiment stores a program to realize an estimation unit 200 (see FIG. 2). The RAM 104 is a memory device used as a work area. The RAM 104 according to the first embodiment includes a request queue 210 (see FIG. 2).

The input/output apparatus 110 inputs data or a request to the radio wave propagation characteristic estimation apparatus 100 based on an operation of a user, and outputs data received from the radio wave propagation characteristic estimation apparatus 100 to the user. The input/output apparatus 110 includes a CPU 111, a communication interface 112, a ROM 113, a RAM 114, an input device 115, and an output device 116. Each hardware is mutually connected via a bus.

The CPU 111, the communication interface 112, the ROM 113, and the RAM 114 are the same hardware as the CPU 101, the communication interface 102, the ROM 103, and the RAM 104. The ROM 113 according to the first embodiment stores a program to realize an operation unit 220.

The input device 115 is a device configured to allow a user to input data or a request and is, for example, a keyboard, a mouse, a touch panel, or the like. The output device 116 is a device configured to output information to be presented to a user and is, for example, a display, a printer, or the like.

The storage apparatus 120 stores various types of data for calculation of a radio wave propagation characteristic in a target space. The storage apparatus 120 includes a controller 121, a communication interface 122, and a plurality of memory devices 123. Each hardware is mutually connected via a bus.

The controller 121 is hardware that controls the entire storage apparatus 120. The controller 121 includes a CPU, a ROM, a RAM, and the like. The communication interface 122 is the same as the communication interface 102. The memory device 123 is a non-volatile memory device that stores data and is, for example, a hard disk drive (HDD), a solid state drive (SSD), or the like.

Incidentally, two or more radio wave propagation characteristic estimation apparatuses 100, two or more input/output apparatuses 110, and two or more storage apparatuses 120 may be provided. Further, the radio wave propagation characteristic estimation apparatus 100 and the storage apparatus 120 may be realized as one apparatus. Further, each of the apparatuses may be realized using a physical computer or may be realized using a virtual computer.

Figure 2:
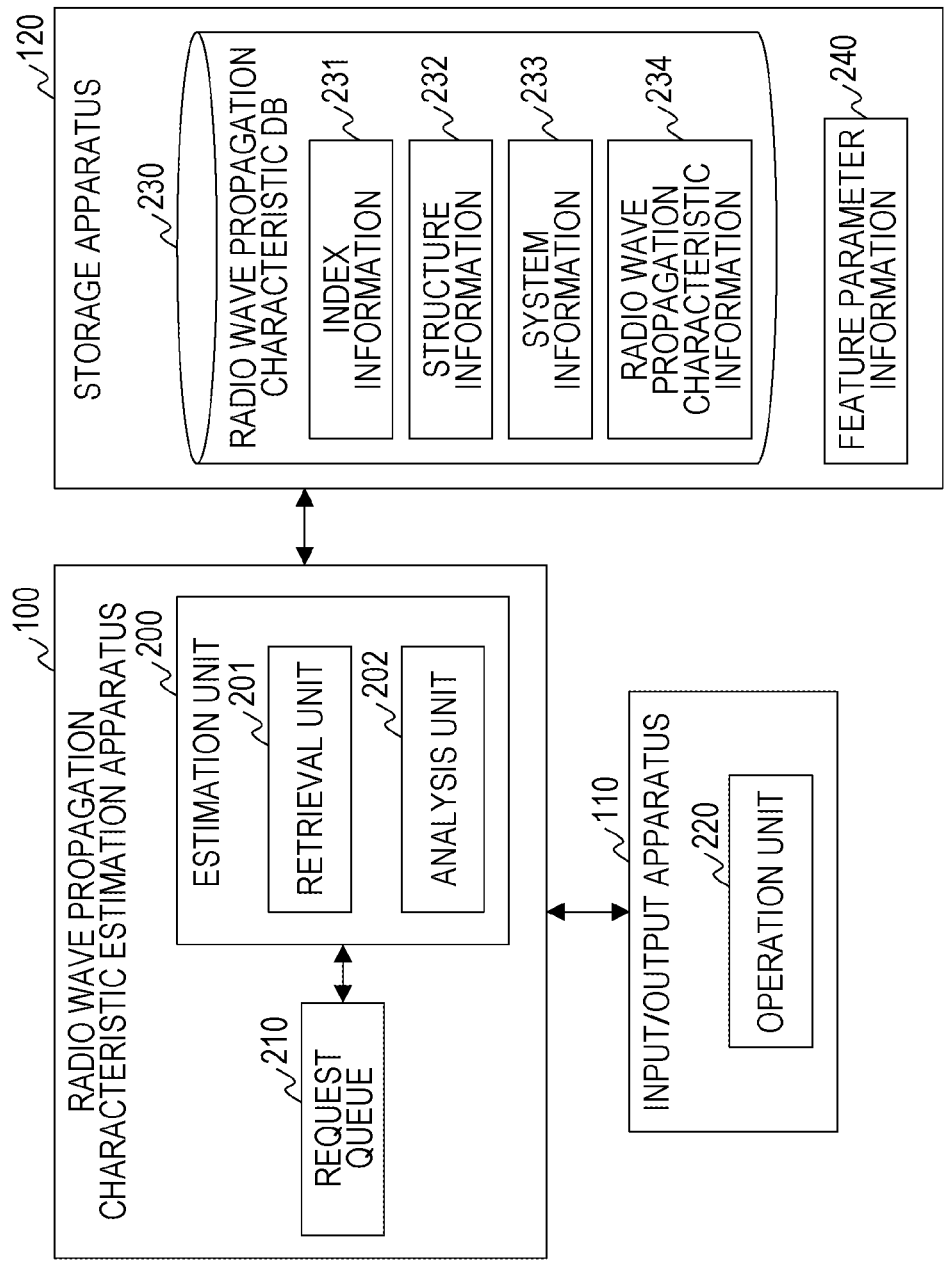
FIG. 2 is a diagram illustrating an example of a functional configuration of the radio wave propagation characteristic estimation system according to the first embodiment.

FIG. 2 is a diagram illustrating an example of a functional configuration of the radio wave propagation characteristic estimation system according to the first embodiment.

The radio wave propagation characteristic estimation apparatus 100 includes the estimation unit 200 and the request queue 210.

The estimation unit 200 executes processing to calculate a radio wave propagation characteristic in a target space. The estimation unit 200 includes a retrieval unit 201 and an analysis unit 202. The retrieval unit 201 retrieves data stored in the storage apparatus 120. The analysis unit 202 performs analysis to calculate the radio wave propagation characteristic in the target space based on the data input from the input/output apparatus 110 and the data retrieved by the retrieval unit 201.

The request queue 210 is a queue that accumulates requests for estimation of a radio wave propagation characteristic in a target space. The estimation unit 200 makes a request inquiry to the request queue 210 after calculating the radio wave propagation characteristic in the target space or periodically.

The input/output apparatus 110 includes the operation unit 220.

The operation unit 220 displays an interface (screen) configured to input data and a request to the radio wave propagation characteristic estimation apparatus 100, and further, displays an interface (screen) to present information on the radio wave propagation characteristic in the target space estimated by the radio wave propagation characteristic estimation apparatus 100. Further, the operation unit 220 transmits the data and request input via the interface to the radio wave propagation characteristic estimation apparatus 100.

The storage apparatus 120 stores a radio wave propagation characteristic DB 230 and feature parameter information 240.

The radio wave propagation characteristic DB 230 is a database that stores information on a measurement result or an estimation result of a radio wave propagation characteristic. The radio wave propagation characteristic DB 230 stores index information 231, structure information 232, system information 233, and radio wave propagation characteristic information 234.

The index information 231 is information to manage an association among structure data, system data, and characteristic data. Details of a data structure of the index information 231 will be described with reference to FIG. 3.

The structure information 232 is information to manage the structure data indicating a structure of a space where a radio wave propagation characteristic has been measured or estimated. The structure data is constituted by parameter values indicating a structure type and a structure characteristic of the space. The structure type of the space may be included as a value of the structure data, or may be included as metadata such as a name. Details of a data structure of the structure information 232 will be described with reference to FIGS. 4A and 4B.

The system information 233 is information to manage the system data constituted by values relating to a design of a wireless communication system in a space where a radio wave propagation characteristic has been measured or estimated. The system data includes, for example, a frequency, output power, polarization, an antenna characteristic, a transmitter position, a receiver position, and the like.

The radio wave propagation characteristic information 234 is information to manage the characteristic data indicating a radio wave propagation characteristic of an arbitrary space, such as a measurement result or an estimation result of the radio wave propagation characteristic. The characteristic data includes data relating to reception power, a propagation loss, a delay spread, and the like of the receiver.

The feature parameter information 240 is information to manage an association between a structure type of a space and structure parameters input when calculating a radio wave propagation characteristic. Details of a data structure of the feature parameter information 240 will be described with reference to FIG. 5.

Regarding the functional units provided in the respective apparatuses, a plurality of functional unit may be integrated as one functional unit, and one functional unit may be divided into a plurality of functional units for each function. Further, the respective functional units may be arranged in a plurality of apparatuses so as to be distributed.

Figure 3:
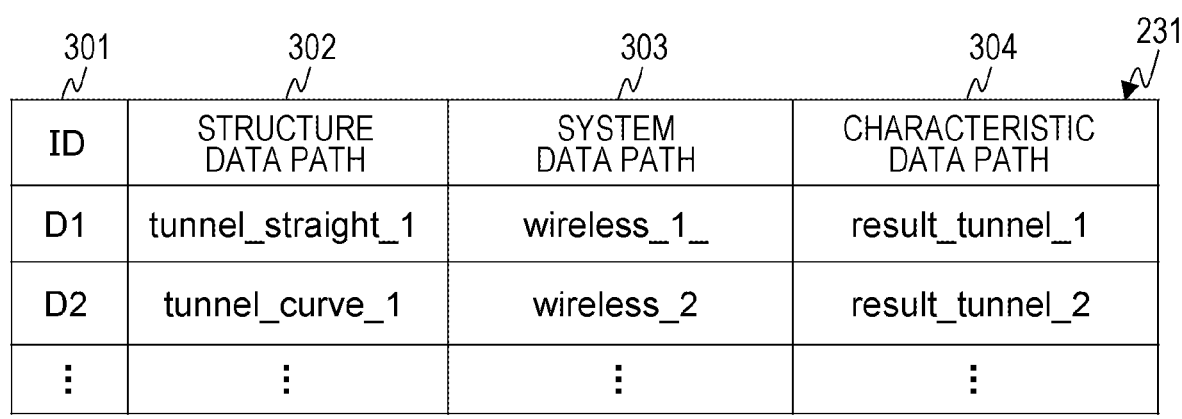
FIG. 3 is a table illustrating an example of a data structure of index information according to the first embodiment.

FIG. 3 is a table illustrating an example of a data structure of the index information 231 according to the first embodiment.

The index information 231 stores an entry including an ID 301, a structure data path 302, a system data path 303, and a characteristic data path 304.

The ID 301 is a field that stores identification information of the entry of index information 231. The structure data path 302 is a field that stores a path of the structure data stored in the structure information 232. The system data path 303 is a field that stores a path of the system data stored in the system information 233. The characteristic data path 304 is a field that stores a path of the characteristic data stored in the radio wave propagation characteristic information 234.

For example, a file name is stored in the structure data path 302, the system data path 303, and the characteristic data path 304. In the first embodiment, the file name stored in the structure data path 302 includes a character string indicating a structure type.

In the following description, the entry of the index information 231 is also referred to as index data.

Figure 4A:
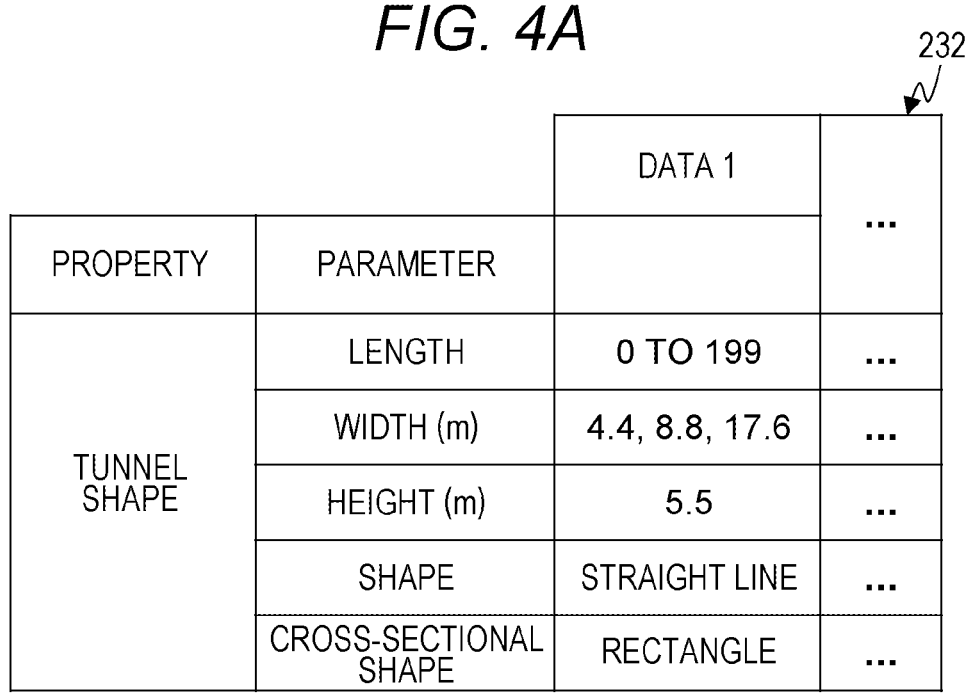
FIG. 4A is a table illustrating an example of a data structure of structure information according to the first embodiment.
Figure 4B:
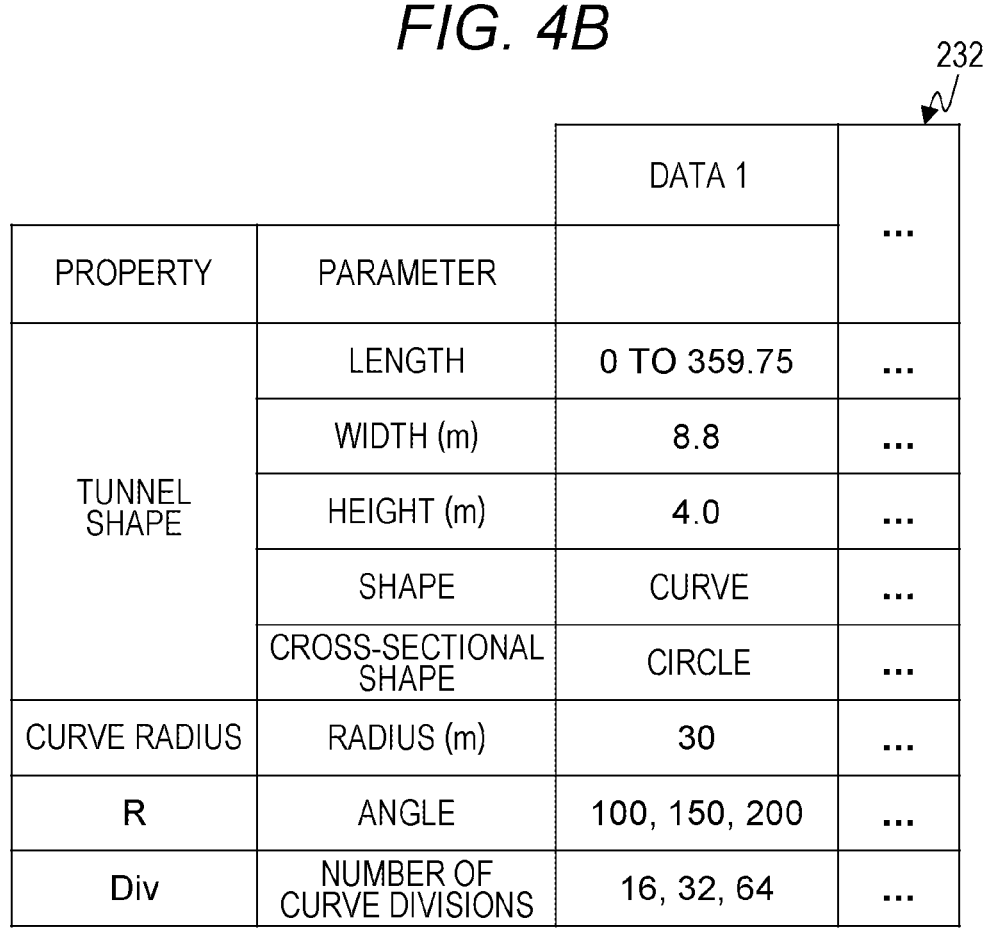
FIG. 4B is a table illustrating an example of the data structure of the structure information according to the first embodiment.

FIGS. 4A and 4B are tables illustrating examples of the data structure of the structure information 232 according to the first embodiment.

In the first embodiment, the structure information 232 is stored for each structure type. For example, the structure information 232 of a tunnel and the structure information 232 of an elevator are stored.

FIG. 4A illustrates the structure information 232 of a matrix type configured to manage a structure of a tunnel having a straight-line shape. FIG. 4B illustrates the structure information 232 of a matrix type configured to manage a structure of a tunnel having a curve. One column corresponds to one structure data. The structure data includes values of various parameters such as a cross-sectional shape, a length, a width, a height, a radius, and an overall shape of the tunnel. Here, "R" refers to an angle of the curve, and "Div" refers to the number of planes used to represent a circle in radio wave propagation characteristic estimation. Incidentally, the parameters included in the structure data are exemplary, and the invention is not limited thereto.

FIG. 5 is a table illustrating an example of the data structure of the feature parameter information 240 according to the first embodiment.

The feature parameter information 240 includes an entry including an ID 501, a structure type 502, and a feature parameter 503. There is one entry for each structure type.

The ID 501 is a field that stores identification information of the entry of the feature parameter information 240. The structure type 502 is a field that stores the structure type. The feature parameter 503 is a field group that stores parameters of the structure data input to calculate a radio wave propagation characteristic. The number and types of parameters to be input differ depending on the structure type.

In the following description, a parameter set in the feature parameter 503 is also referred to as a feature parameter.

Next, processing to be executed in the radio wave propagation characteristic estimation system will be described.

Figure 6:
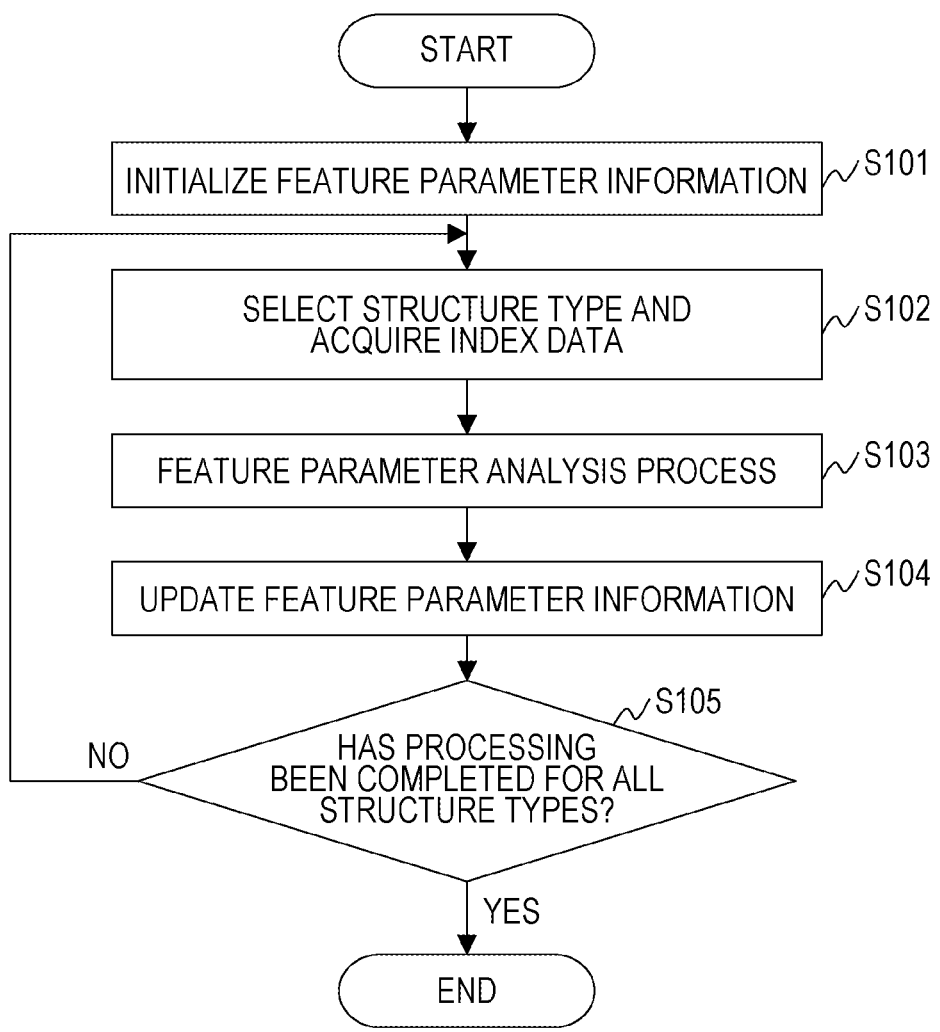
FIG. 6 is a flowchart illustrating a feature parameter information generation process executed by the radio wave propagation characteristic estimation apparatus according to the first embodiment.

FIG. 6 is a flowchart illustrating a generation process of the feature parameter information 240 executed by the radio wave propagation characteristic estimation apparatus 100 according to the first embodiment.

The analysis unit 202 executes the process of generating the feature parameter information 240 to be described below at an arbitrary timing. For example, the analysis unit 202 executes the process of generating the feature parameter information 240 when a generation request or an estimation request for the feature parameter information 240 is received from the input/output apparatus 110, or when an execution period has elapsed.

The analysis unit 202 initializes the feature parameter information 240 (Step S101). Next, the analysis unit 202 selects a structure type (target structure type), and acquires index data associated with the structure data belonging to the target structure type (Step S102).

Specifically, the analysis unit 202 refers to the structure information 232, generates a list of structure types, and selects the target structure type from the list. The analysis unit 202 refers to the index information 231 and specifies an entry including a character string relating to the target structure type in the structure data path 302. The analysis unit 202 acquires structure data, system data, and characteristic data from the radio wave propagation characteristic DB 230 based on the structure data path 302, the system data path 303, and the characteristic data path 304 of the specified entry.

Next, the analysis unit 202 executes a feature parameter analysis process using the acquired structure data, system data, and characteristic data (Step S103). Specifically, the following processing is executed.

(Processing A1) The analysis unit 202 generates a predictor configured to calculate characteristic data from the structure data and system data by executing machine learning using the structure data, system data, and characteristic data. Further, the analysis unit 202 calculates the degree of influence indicating the magnitude of contribution of each parameter value of the structure data in estimation of a radio wave propagation characteristic in a space using the predictor. The degree of influence is calculated using, for example, a calculation method described in "LUNDBERG, Scott M.; LEE, Su-In. A unified approach to interpreting model predictions. In: Advances in Neural Information Processing Systems. 2017. p. 4768-4777".

(Processing A2) The analysis unit 202 specifies a parameter having the magnitude of the degree of influence greater than a threshold as a feature parameter.

The following processing may be executed instead of (Processing A1) and (Processing A2).

(Processing B1) The analysis unit 202 executes an analysis process using the structure data, system data, and characteristic data to generate a simulation model (function) having parameters of the structure data and system data as explanatory variables and a parameter of the characteristic data as an explanatory variable.

(Processing B2) The analysis unit 202 compares a coefficient of the variable corresponding to the parameter of the structure data with a threshold to specify the parameter whose coefficient is greater than the threshold as a feature parameter.

The processing in Step S103 has been described as above.

Next, the analysis unit 202 updates the feature parameter information 240 (Step S104).

Specifically, the analysis unit 202 adds an entry to the feature parameter information 240, sets identification information in the ID 501 of the added entry, and further, sets a target structure type in the structure type 502 of the entry. The analysis unit 202 sets a name of the feature parameter specified in the feature parameter analysis process in the feature parameter 503. At this time, the names of the feature parameters are set in a descending order of the degree of influence or the coefficient.

Next, the analysis unit 202 determines whether or not the processing has been completed for all structure types (Step S105).

When it is determined that the processing has not been completed for all the structure types, the analysis unit 202 returns to Step S102 and executes the same processing.

When it is determined that the processing has been completed for all the structure types, the analysis unit 202 ends the process of generating the feature parameter information 240.

Figure 7:
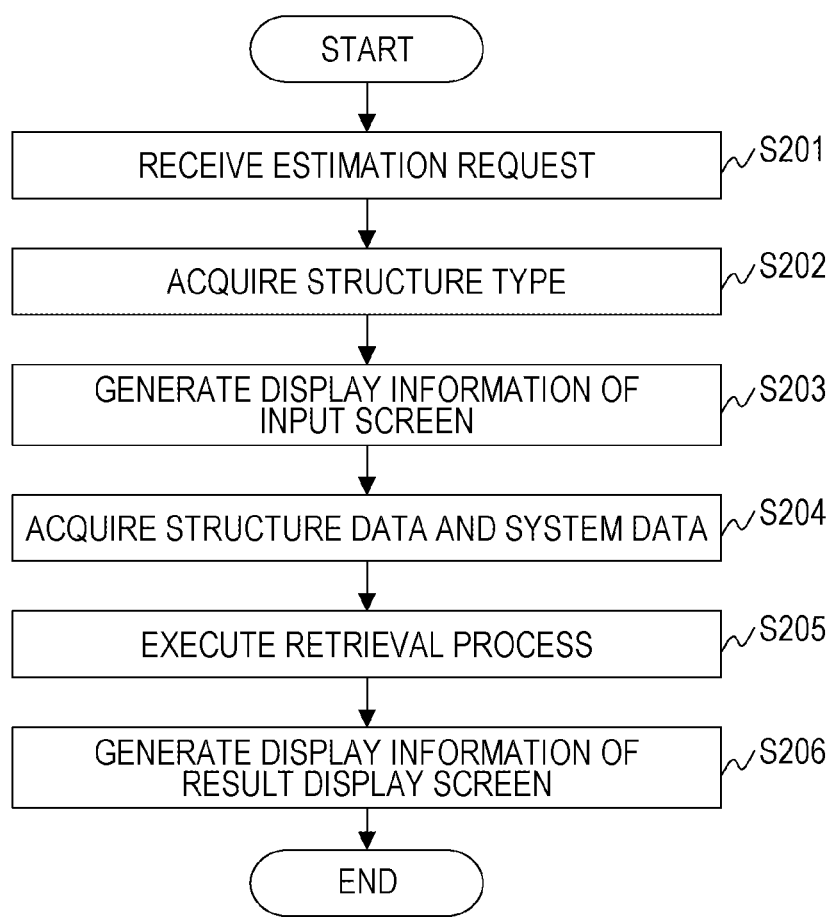
FIG. 7 is a flowchart illustrating a radio wave propagation characteristic estimation process executed by the radio wave propagation characteristic estimation apparatus according to the first embodiment.
Figure 8:
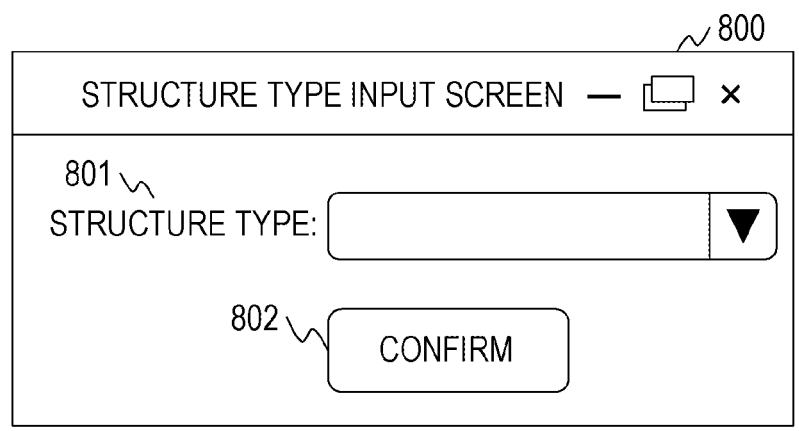
FIG. 8 is a view illustrating an example of a structure type input screen displayed by the input/output apparatus according to the first embodiment.
Figure 11:
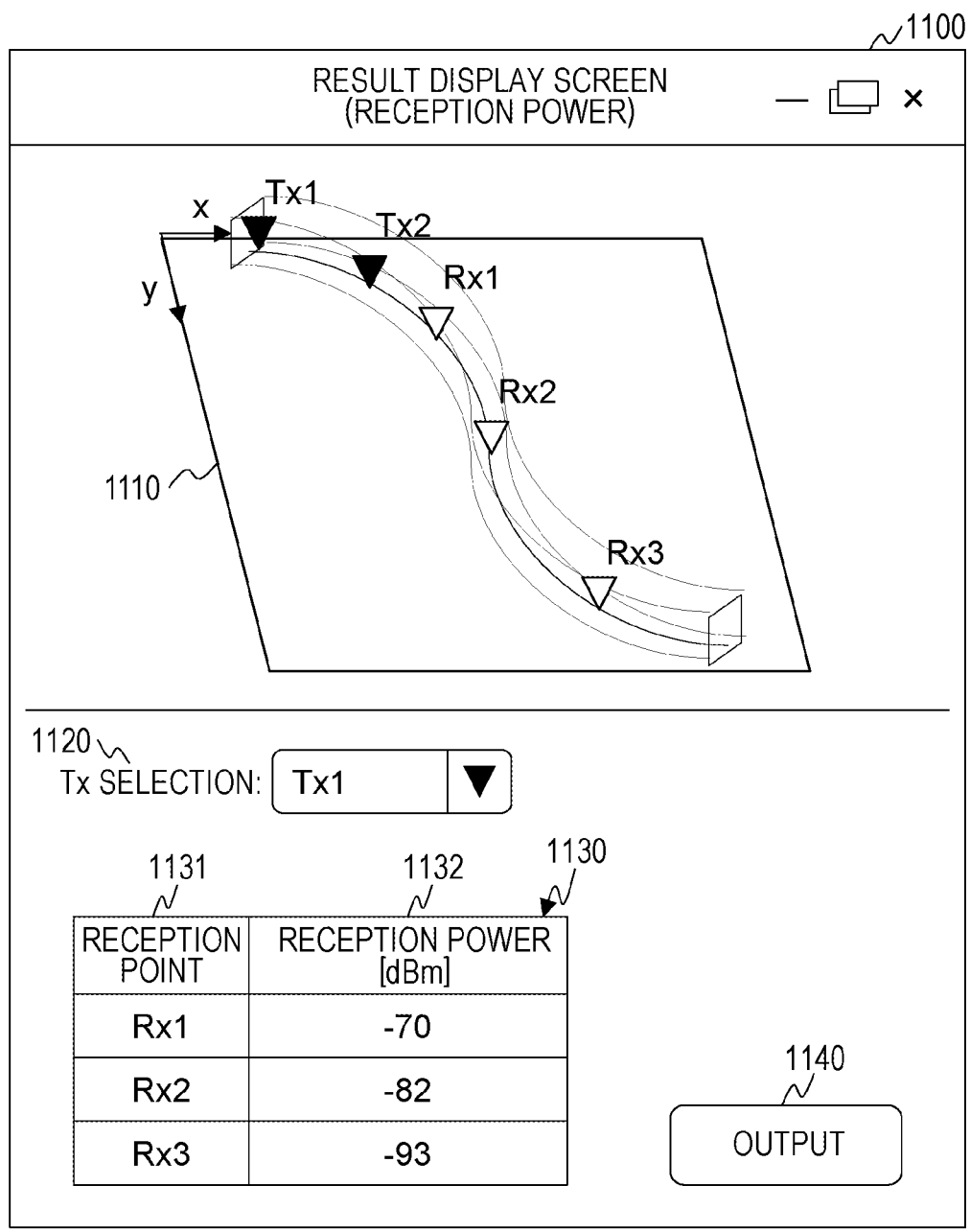
FIG. 11 is a view illustrating an example of a result display screen (reception power) displayed by the input/output apparatus according to the first embodiment.
Figure 12:
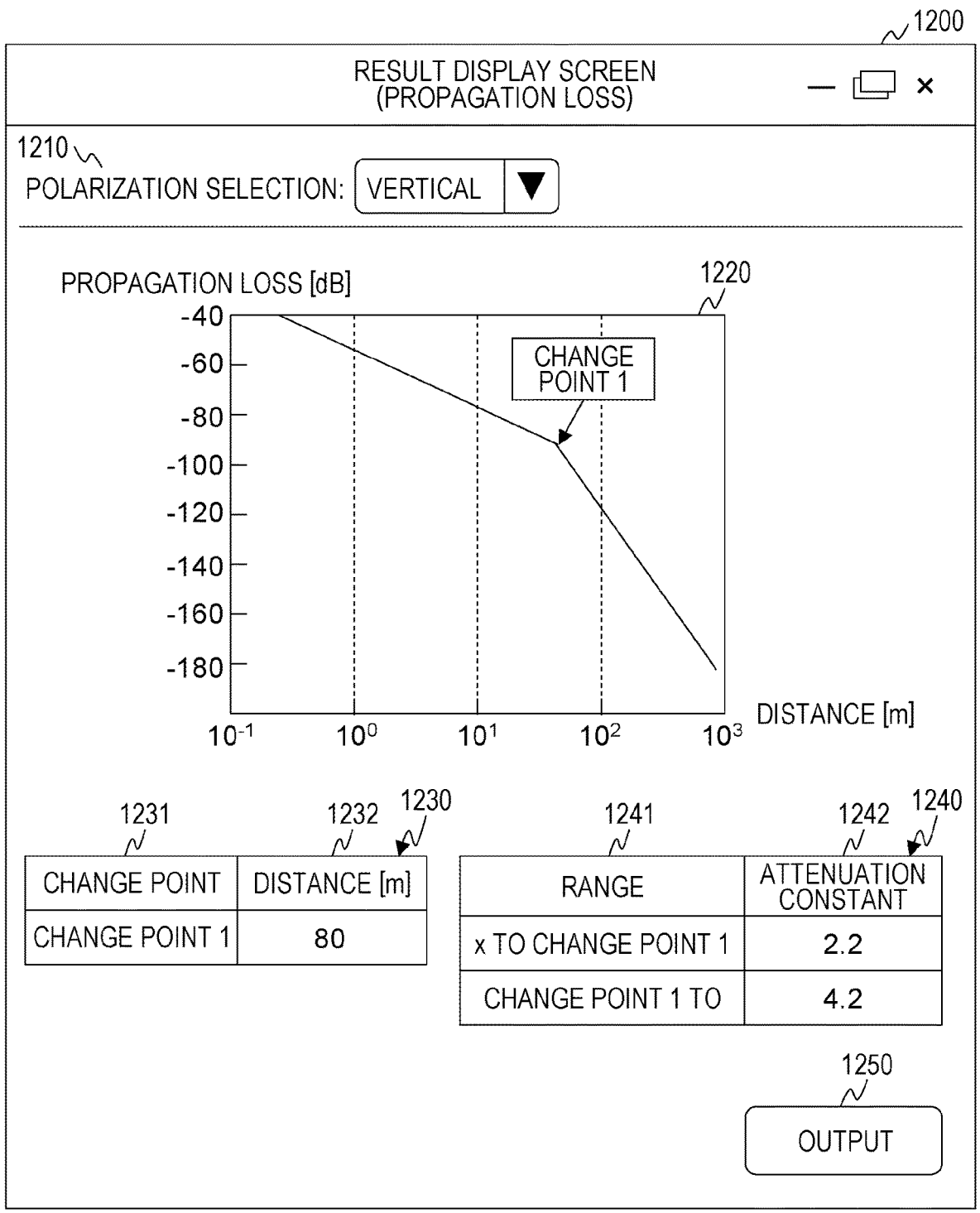
FIG. 12 is a view illustrating an example of the result display screen (propagation loss) displayed by the input/output apparatus according to the first embodiment.
Figure 13:
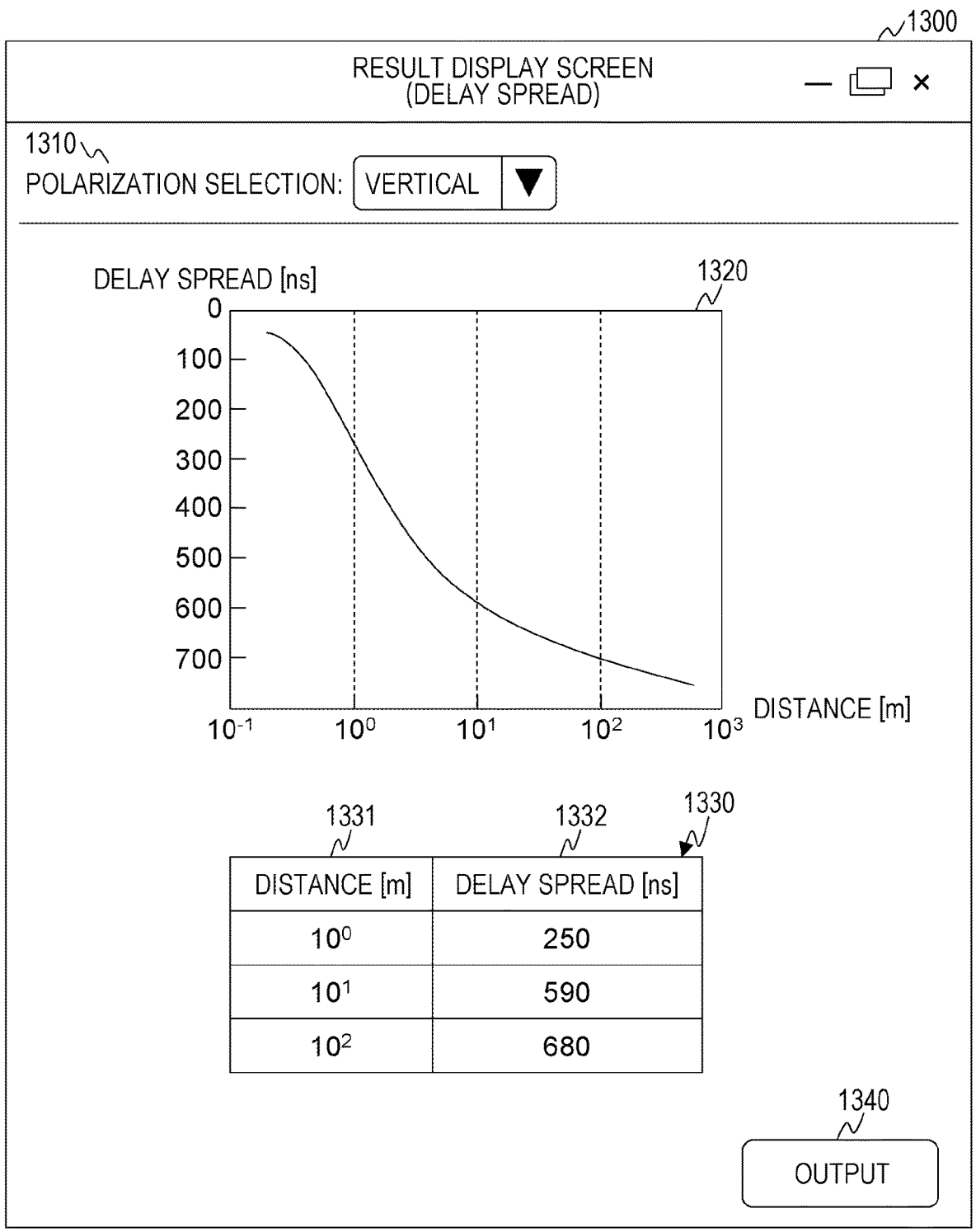
FIG. 13 is a view illustrating an example of the result display screen (a delay spread) displayed by the input/output apparatus according to the first embodiment.

FIG. 7 is a flowchart illustrating a radio wave propagation characteristic estimation process executed by the radio wave propagation characteristic estimation apparatus 100 according to the first embodiment. FIG. 8 is a view illustrating an example of a structure type input screen 800 displayed by the input/output apparatus 110 according to the first embodiment. FIGS. 9A, 9B, 9C, and 9D are views illustrating examples of a structure data input screen 900 displayed by the input/output apparatus 110 according to the first embodiment. FIG. 10 is a view illustrating an example of a system data input screen 1000 displayed by the input/output apparatus 110 according to the first embodiment. FIG. 11 is a view illustrating an example of a result display screen (reception power) 1100 displayed by the input/output apparatus 110 according to the first embodiment. FIG. 12 is a view illustrating an example of the result display screen (propagation loss) 1200 displayed by the input/output apparatus 110 according to the first embodiment. FIG. 13 is a view illustrating an example of the result display screen (a delay spread) 1300 displayed by the input/output apparatus 110 according to the first embodiment.

The radio wave propagation characteristic estimation apparatus 100 receives an estimation request from the input/output apparatus 110 (Step S201). The estimation request is accumulated in the request queue 210. The estimation request includes an address of the input/output apparatus 110 and the like.

When the estimation unit 200 acquires the estimation request from the request queue 210, the estimation unit 200 acquires a structure type from the input/output apparatus 110 (Step S202).

Specifically, the estimation unit 200 generates first display information to display the structure type input screen 800, and transmits the first display information to the input/output apparatus 110.

When receiving the first display information, the operation unit 220 of the input/output apparatus 110 displays the structure type input screen 800 illustrated in FIG. 8.

The structure type input screen 800 includes a structure type input field 801 and a confirmation button 802. The structure type input field 801 is a field to input a structure type. In the structure type input field 801, "tunnel (straight line)", "tunnel (curve)", "elevator (rectangular)", "elevator (circle)", and the like are input. The confirmation button 802 is an operation button configured to transmit a value set in the structure type input field 801 to the radio wave propagation characteristic estimation apparatus 100.

Next, the estimation unit 200 generates display information of an input screen configured to acquire structure data and system data (Step S203). Specifically, the following processing is executed.

(Processing C1) The retrieval unit 201 of the estimation unit 200 refers to the feature parameter information 240 and retrieves an entry in which the acquired structure type is set in the structure type 502. The estimation unit 200 refers to the feature parameter 503 of the retrieved entry and specifies a feature parameter. The estimation unit 200 generates second display information to display the structure data input screen 900 configured to input a value of the specified feature parameter. The estimation unit 200 transmits the second display information to the input/output apparatus 110.

When receiving the second display information, the operation unit 220 of the input/output apparatus 110 displays the structure data input screen 900. Here, the structure data input screen 900 will be described with reference to FIGS. 9A, 9B, 9C, and 9D.

Figure 9A:
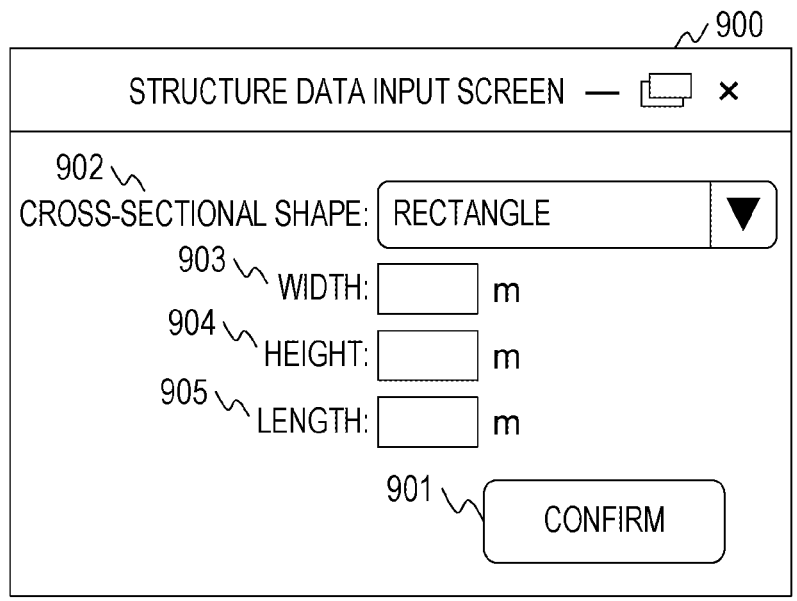
FIG. 9A is a view illustrating an example of a structure data input screen displayed by the input/output apparatus according to the first embodiment.

FIG. 9A illustrates the structure data input screen 900 displayed when the structure type is "tunnel (straight line)". The structure data input screen 900 includes a confirmation button 901, a cross-sectional shape input field 902, a width input field 903, a height input field 904, and a length input field 905.

The cross-sectional shape input field 902 is a field to input a cross-sectional shape of the tunnel. In the cross-sectional shape input field 902, "rectangle", "circle", and the like are input. The width input field 903 is a field to input a width of a cross section of the tunnel. The height input field 904 is a field to input a height of the cross section of the tunnel. The length input field 905 is a field to input a total length of the tunnel. The confirmation button 901 is an operation button configured to transmit a value of each field to the radio wave propagation characteristic estimation apparatus 100.

Figure 9B:
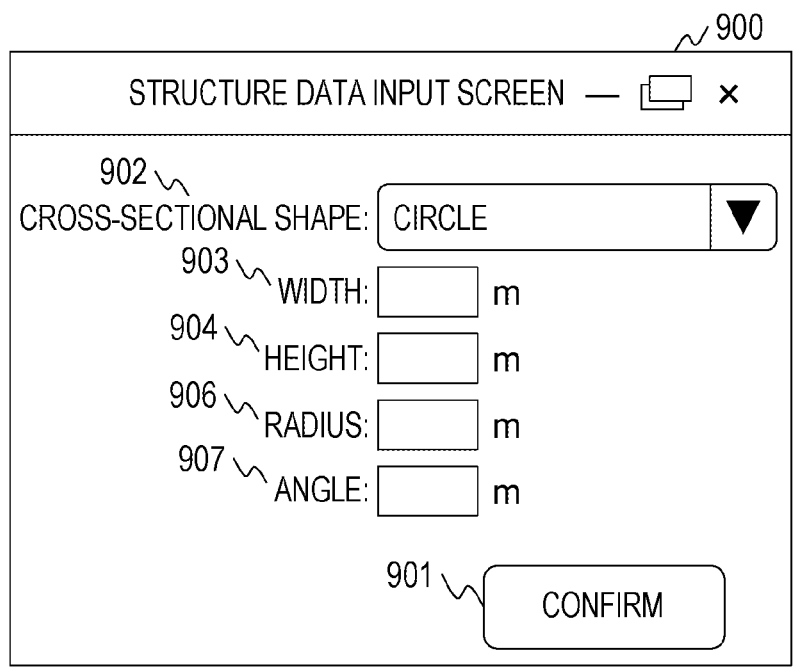
FIG. 9B is a view illustrating an example of the structure data input screen displayed by the input/output apparatus according to the first embodiment.

FIG. 9B illustrates the structure data input screen 900 displayed when the structure type is "tunnel (curve)". The structure data input screen 900 includes a confirmation button 901, a cross-sectional shape input field 902, a width input field 903, a height input field 904, a radius input field 906, and an angle input field 907.

The radius input field 906 and the angle input field 907 are fields to input a radius and an angle indicating a shape of the curve.

Figure 9C:
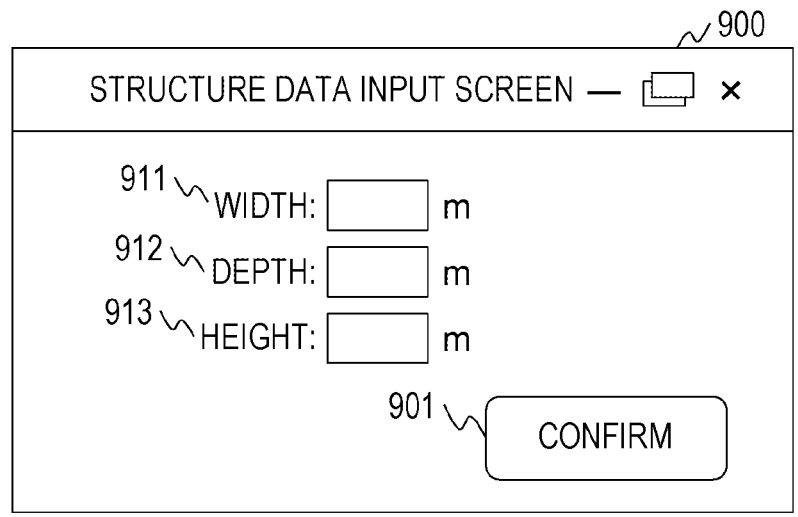
FIG. 9C is a view illustrating an example of the structure data input screen displayed by the input/output apparatus according to the first embodiment.

FIG. 9C illustrates the structure data input screen 900 displayed when the structure type is "elevator (cube)". The structure data input screen 900 includes a confirmation button 901, a width input field 911, a depth input field 912, and a height input field 913.

The width input field 911 is a field to input a width of the elevator. The depth input field 912 is a field to input a depth of the elevator. The height input field 913 is a field to input a height of the elevator.

Figure 9D:
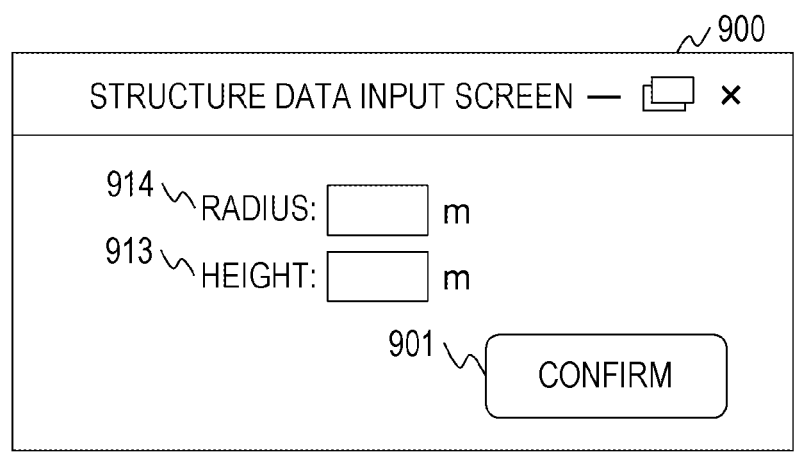
FIG. 9D is a view illustrating an example of the structure data input screen displayed by the input/output apparatus according to the first embodiment.

FIG. 9D illustrates the structure data input screen 900 displayed when the structure type is "elevator (cylinder)". The structure data input screen 900 includes a confirmation button 901, a radius input field 914, and a height input field 913.

The radius input field 914 is a field to input a radius of the cylindrical elevator.

The structure data input screen 900 has been described as above. A description will be given returning to the description of Step S203.

(Processing C2) The estimation unit 200 Generates third display information to display the system data input screen 1000 configured to input system data. The estimation unit 200 transmits the third display information to the input/output apparatus 110.

When receiving the third display information, the operation unit 220 of the input/output apparatus 110 displays the system data input screen 1000. Here, the system data input screen 1000 will be described with reference to FIG. 10.

The system data input screen 1000 includes a frequency input field 1001, an output power input field 1002, a polarization input field 1003, an antenna input field 1004, a Tx coordinate selection field 1005, a Tx coordinate input field 1006, an add button 1007, an Rx coordinate selection field 1008, an Rx coordinate input field 1009, an add button 1010, and a confirmation button 1011.

The frequency input field 1001 is a field to input a radio frequency. The output power input field 1002 is a field to input output power. The polarization input field 1003 is a field to input a transmission scheme, and either "horizontal polarization" or "vertical polarization" is input thereto.

The antenna input field 1004 is a field to input a type of an antenna to be used. In the antenna input field 1004, a dipole antenna, a pole antenna, or the like is input. Incidentally, a field to input information on an antenna characteristic indicating a gain for each angle of an antenna may be provided instead of the antenna input field 1004.

The Tx coordinate selection field 1005 is a field to select a transmission antenna coordinate setting scheme. In the Tx coordinate selection field 1005, either "manual" or "file" is input. "Manual" is a scheme in which a user manually sets coordinates, and "file" is a scheme in which coordinates are set using a setting file.

The Tx coordinate input field 1006 and the add button 1007 are fields that are displayed when the Tx coordinate selection field 1005 is "manual". The Tx coordinate input field 1006 is a field to input coordinates of a transmission antenna. The add button 1007 is an operation button configured to add the coordinates of the transmission antenna. When the add button 1007 is operated, the new Tx coordinate input field 1006 is added to the system data input screen 1000.

When the Tx coordinate selection field 1005 is "file", a file designation field is displayed instead of the Tx coordinate input field 1006 and the add button 1007.

The Rx coordinate selection field 1008 is a field to select a reception antenna coordinate setting scheme. In the Rx coordinate selection field 1008, either "manual" or "file" is input.

The Rx coordinate input field 1009 and the add button 1010 are fields that are displayed when the Rx coordinate selection field 1008 is "manual". The Rx coordinate input field 1009 is a field to input coordinates of the reception antenna. The add button 1010 is an operation button configured to add the coordinates of the reception antenna. When the add button 1010 is operated, the new Rx coordinate input field 1009 is added to the system data input screen 1000.

When the Rx coordinate selection field 1008 is "file", a file designation field is displayed instead of the Rx coordinate input field 1009 and the add button 1010.

The confirmation button 1011 is an operation button configured to transmit a value of each field to the radio wave propagation characteristic estimation apparatus 100.

The system data input screen 1000 has been described as above. A description will be given returning to the description of Step S203.

(Processing C3) The estimation unit 200 transitions to a standby state after transmitting the second display information and the third display information to the input/output apparatus 110. In the following description, data input via the structure data input screen 900 is referred to as estimation structure data, and data input via the system data input screen 1000 is referred to as estimation system data.

A user can grasp parameters necessary to calculate a radio wave propagation characteristic with reference to the structure data input screen 900. In the first embodiment, it is not necessary to input detailed structure data. Further, the user can efficiently measure a structure of a target space based on the parameters displayed on the structure data input screen 900. The processing in Step S203 has been described as above.

Next, when acquiring the estimation structure data and the estimation system data (Step S204), the estimation unit 200 executes a retrieval process based on the acquired data (Step S205). Specifically, the following processing is executed.

(Processing D1) The retrieval unit 201 refers to the structure information 232 and acquires structure data corresponding to the structure type acquired in Step S202. The retrieval unit 201 refers to the structure data path 302 of the index information 231 to retrieve an entry (index data) in which identification information of the acquired structure data is set. The retrieval unit 201 acquires structure data and system data from the system information 233 based on the system data path 303 of the retrieved entry.

(Processing D2) The analysis unit 202 calculates a first index indicating a similarity between the estimation structure data and the acquired structure data, and calculates a second index indicating a similarity between the estimation system data and the acquired system data.

For example, a distance between a vector generated from the estimation structure data and a vector generated from the acquired structure data is calculated as the first index. Incidentally, the vector generated from the estimation structure data includes a feature parameter value included in the estimation structure data as an element. Further, the vector generated from the structure data includes a feature parameter value in the structure data as an element.

(Processing D3) The analysis unit 202 selects a candidate entry from retrieved entries based on a comparison result between the first index and a first threshold and a comparison result between the second index and a second threshold. For example, an entry in which the first index is larger than the first threshold and the second index is larger than the second threshold is selected as the candidate entry. Incidentally, the first threshold and the second threshold are set in advance.

(Processing D4) For each candidate entry, the analysis unit 202 calculates a total value of a difference between the first index and the first threshold and a difference between the second index and the second threshold. The analysis unit 202 selects a candidate entry having the smallest total value as an estimation entry.

(Processing D5) The analysis unit 202 acquires characteristic data from the radio wave propagation characteristic information 234 based on the characteristic data path 304 of the estimation entry.

As described above, the estimation unit 200 acquires characteristic data in which structure data and system data are associated with a set of structure data and system data that is the most similar to the estimation structure data and the estimation system data in the retrieval process. (Processing D1) to (Processing D5) are examples of the above-described processing, and the invention is not limited thereto.

The processing in Step S205 has been described as above.

Next, the estimation unit 200 generates fourth display information to display the result display screens 1100, 1200, and 1300 indicating radio wave propagation characteristic estimation results using the characteristic data acquired by the retrieval process (Step S206). The estimation unit 200 ends the radio wave propagation characteristic estimation process after transmitting the fourth display information to the input/output apparatus 110.

When receiving the fourth display information, the operation unit 220 of the input/output apparatus 110 displays the result display screens 1100, 1200, and 1300. Here, the result display screens 1100, 1200, and 1300 will be described with reference to FIGS. 11, 12, and 13.

FIG. 11 is the result display screen 1100 that displays information relating on reception power of a reception antenna. The result display screen 1100 includes a structure display field 1110, a Tx selection field 1120, a reception power display field 1130, and an output button 1140.

The structure display field 1110 is a view illustrating a structure of a target space and a configuration of a communication system constructed in the target space. The view displayed in the structure display field 1110 is generated based on the estimation structure data and the estimation system data. In the structure display field 1110 of FIG. 11, a structure of a tunnel having a curve is displayed. Further, the structure display field 1110 in FIG. 11 displays installation positions of a transmission antenna and a reception antenna.

The Tx selection field 1120 is a field to select the transmission antenna.

The reception power display field 1130 is a field to display the reception power of the reception antenna that has received a radio wave transmitted from the transmission antenna selected using the Tx selection field 1120. In the reception power display field 1130, information in a table format is displayed. The information includes an entry constituted by a reception point 1131 and reception power 1132. The reception point 1131 is a field that stores identification information of the reception antenna. The reception power 1132 is a field that stores the reception power of the reception antenna corresponding to the reception point 1131.

The output button 1140 is an operation button configured to acquire data. When the output button 1140 is operated, the input/output apparatus 110 transmits an output request to the radio wave propagation characteristic estimation apparatus 100. When receiving the output request, the estimation unit 200 of the radio wave propagation characteristic estimation apparatus 100 generates output data including the information and the like displayed in the reception power display field 1130, and transmits the output data to the input/output apparatus 110.

FIG. 12 illustrates the result display screen 1200 that displays information on a propagation loss. The result display screen 1200 includes a polarization selection field 1210, a graph display field 1220, a change point information field 1230, an attenuation constant information field 1240, and an output button 1250.

The polarization selection field 1210 is a field to select a type of polarization. In the first embodiment, either "vertically polarization" or "horizontal polarization" is selected. In the graph display field 1220, the change point information field 1230, and the attenuation constant information field 1240, information corresponding to the polarization input to the polarization selection field 1210 is displayed.

The graph display field 1220 is a field to display a graph indicating a relationship between a distance and a propagation loss. The vertical axis of the graph displayed in the graph display field 1220 represents the propagation loss, and the horizontal axis represents the distance from a transmission antenna. Further, the graph includes information indicating a point (change point) where an attenuation multiplier greatly changes.

The change point information field 1230 is a field to display information on a change point. The change point information field 1230 displays information in a table format. The information includes an entry constituted by a change point 1231 and a distance 1232. The change point 1231 is a field that stores identification information such as a name of a change point. The distance 1232 is a field that stores a distance from a transmission antenna.

The attenuation constant information field 1240 is a field to display information on an attenuation constant. The attenuation constant information field 1240 displays information in a table format. The information includes an entry constituted by a range 1241 and an attenuation constant 1242. The range 1241 is a field that stores information indicating a range where the attenuation constant is fixed. The attenuation constant 1242 is a field that stores the attenuation constant in the range 1241.

The output button 1250 is an operation button configured to acquire data. When the output button 1250 is operated, the input/output apparatus 110 transmits an output request to the radio wave propagation characteristic estimation apparatus 100. When receiving the output request, the estimation unit 200 of the radio wave propagation characteristic estimation apparatus 100 generates output data including the information and the like displayed in the change point information field 1230 and the attenuation constant information field 1240, and transmits the output data to the input/output apparatus 110.

FIG. 13 illustrates the result display screen 1300 that displays information on a delay spread. The result display screen 1300 includes a polarization selection field 1310, a graph display field 1320, a delay spread information display field 1330, and an output button 1340.

The polarization selection field 1310 is the same field as the polarization selection field 1210. Information corresponding to polarization input to the polarization selection field 1310 is displayed in the graph display field 1320 and the delay spread information display field 1330.

The graph display field 1320 is a field to display a graph indicating a relationship between a distance and a delay spread. The vertical axis of the graph displayed in the graph display field 1320 represents the delay spread, and the horizontal axis represents the distance from a transmission antenna.

The delay spread information display field 1330 is a field to display a delay spread at an arbitrary distance. The delay spread information display field 1330 displays information in a table format. The information includes an entry constituted by a distance 1331 and a delay spread 1332. The distance 1331 is a field that stores a distance from a transmission antenna. The delay spread 1332 is a field that stores a delay spread at a position corresponding to the distance 1331.

The output button 1340 is an operation button configured to acquire data. When the output button 1340 is operated, the input/output apparatus 110 transmits an output request to the radio wave propagation characteristic estimation apparatus 100. When receiving the output request, the estimation unit 200 of the radio wave propagation characteristic estimation apparatus 100 generates output data including the information and the like displayed in the delay spread information display field 1330, and transmits the output data to the input/output apparatus 110.

Although the estimation unit 200 outputs the acquired characteristic data as it is in the radio wave propagation characteristic estimation process, the invention is not limited thereto. For example, the estimation unit 200 may correct the acquired characteristic data based on the difference between the first index and first threshold and the difference between the second index and the second threshold.

According to the first embodiment, the radio wave propagation characteristic estimation apparatus 100 can present a screen (the structure data input screen 900) configured to input a rough structure of a target space, retrieve a measurement result or an estimation result of a radio wave propagation characteristic based on structure data input via the screen, and present the retrieved information as the radio wave propagation characteristic estimation result.

Since the retrieval is performed using the parameters having great influence on the characteristic data, it is possible to output the estimation result at a high speed while maintaining the estimation accuracy. Further, it is possible to reduce the burden on the user required for estimation since it is not necessary to input the detailed structure data.

Further, the user can grasp the parameters to be measured in order to estimate the radio wave propagation characteristic in the target space by referring to the structure data input screen 900. As a result, it is possible to reduce the burden on the user required to acquire the structure data.

Second Embodiment

A second embodiment is different from the first embodiment in terms of a method for calculating a radio wave propagation characteristic. Hereinafter, the second embodiment will be described focusing on the difference from the first embodiment.

Figure 14:
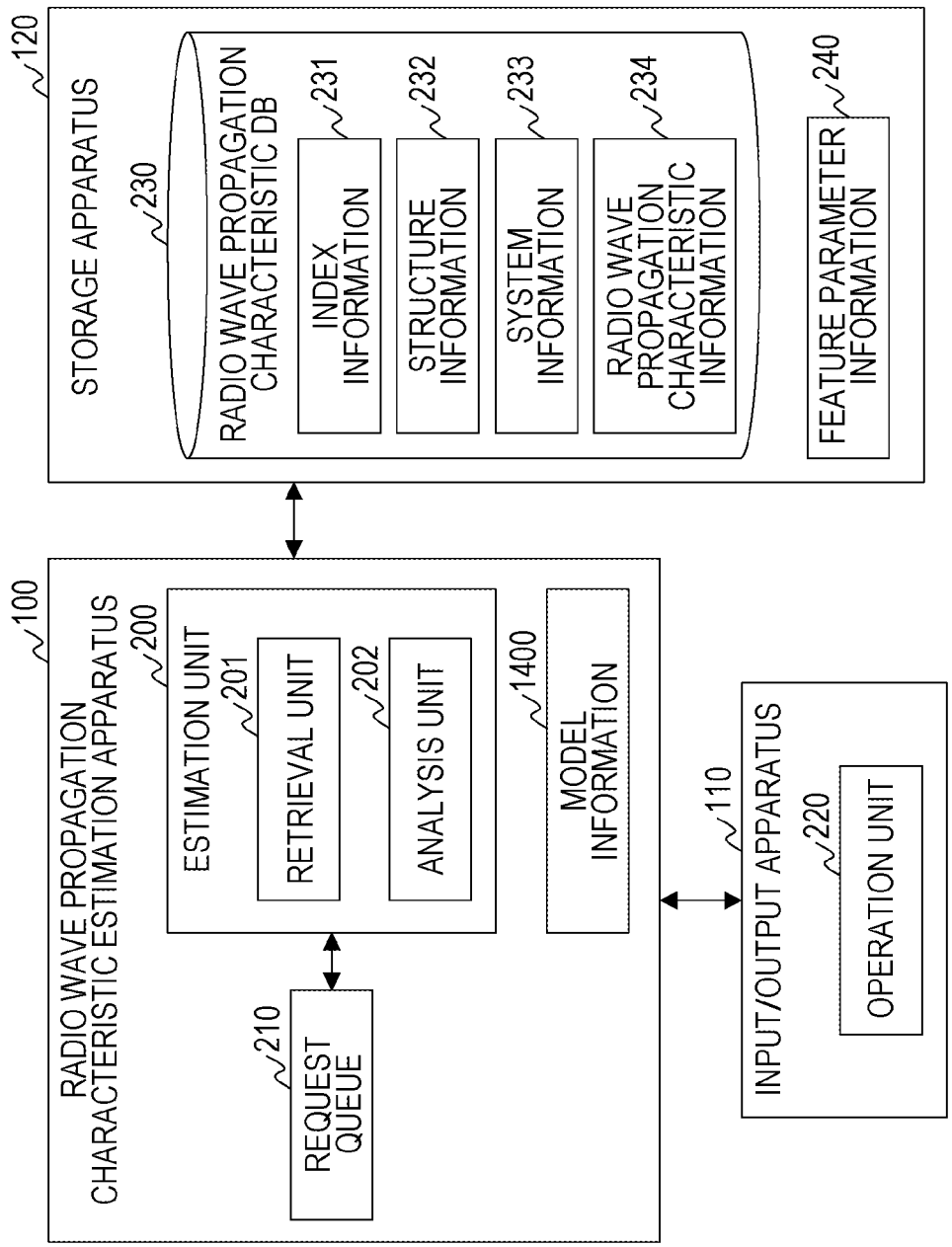
FIG. 14 is a diagram illustrating an example of a functional configuration of a radio wave propagation characteristic estimation system according to a second embodiment.

Since a system configuration of a radio wave propagation characteristic estimation system according to the second embodiment is the same as that of the first embodiment, the description thereof will be omitted. In the second embodiment, some functional configurations of the radio wave propagation characteristic estimation system are different. FIG. 14 is a diagram illustrating an example of the functional configuration of the radio wave propagation characteristic estimation system according to the second embodiment.

The radio wave propagation characteristic estimation apparatus 100 according to the second embodiment holds model information 1400 for each structure type. The other functional configurations are the same as those in the first embodiment.

The model information 1400 is information to realize a predictor or a simulator configured to calculate characteristic data from estimation structure data and estimation system data.

In the second embodiment, a process of generating the feature parameter information 240 is partially different. Specifically, the analysis unit 202 saves the model information 1400 that defines the generated predictor or simulator in a feature parameter analysis process. Other processes are the same as those in the first embodiment.

Figure 15:
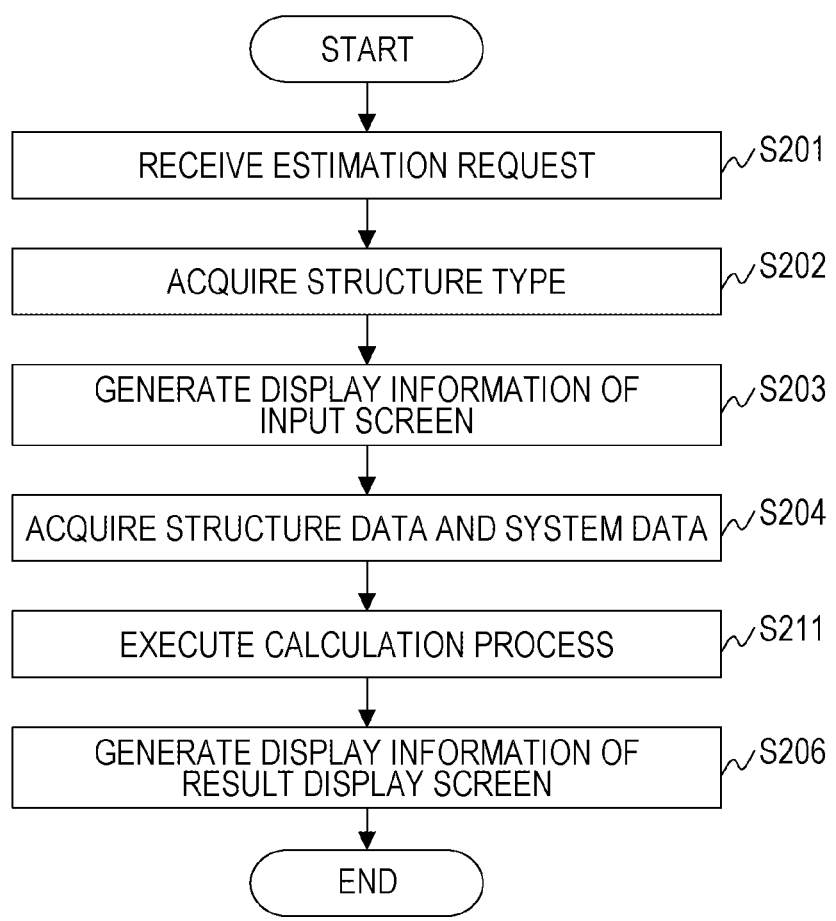
FIG. 15 is a flowchart illustrating a radio wave propagation characteristic estimation process executed by the radio wave propagation characteristic estimation apparatus according to the second embodiment.

FIG. 15 is a flowchart illustrating a radio wave propagation characteristic estimation process executed by the radio wave propagation characteristic estimation apparatus 100 according to the second embodiment.

The processing from Step S201 to Step S204 is the same as that in the first embodiment. The estimation unit 200 performs a calculation process after the processing in Step S204 (Step S211).

Specifically, the analysis unit 202 acquires the model information 1400 corresponding to a structure type acquired in Step S202. The analysis unit 202 processes the estimation structure data and the estimation system data based on the model information 1400 to calculate characteristic data.

In Step S206, the analysis unit 202 generates fourth display information using the calculated characteristic data.

According to the second embodiment, a radio wave propagation characteristic in a target space can be estimated even when there is no combination of structure data and system data similar to a combination of estimation structure data and estimation system data in the radio wave propagation characteristic DB 230.

Third Embodiment

In a third embodiment, the radio wave propagation characteristic estimation apparatus 100 updates the radio wave propagation characteristic DB 230. Hereinafter, the third embodiment will be described focusing on the difference from the first embodiment.

Figure 16:
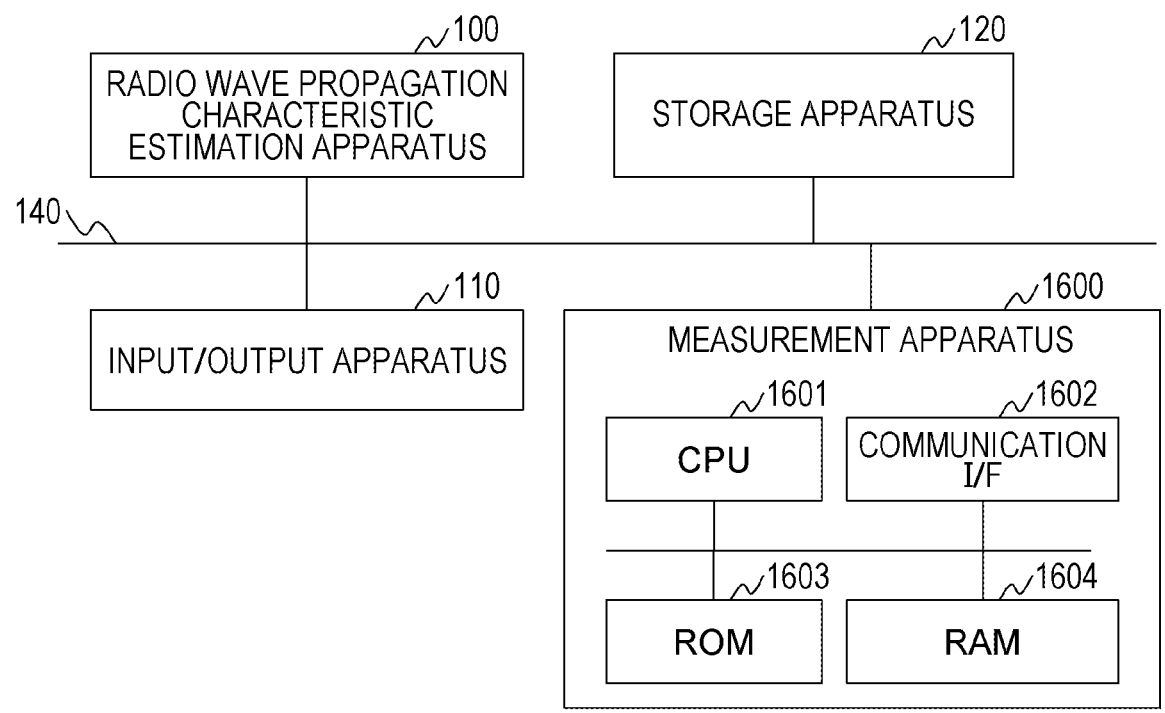
FIG. 16 is a diagram illustrating a system configuration of a radio wave propagation characteristic estimation system according to a third embodiment.

FIG. 16 is a diagram illustrating a system configuration of a radio wave propagation characteristic estimation system according to the third embodiment.

The radio wave propagation characteristic estimation system according to the third embodiment includes a measurement apparatus 1600. Other apparatuses are the same as those in the first embodiment.

The measurement apparatus 1600 is an apparatus that performs measurement relating to a radio wave propagation characteristic. The measurement apparatus 1600 includes a CPU 1601, a communication interface 1602, a ROM 1603, and a RAM 1604. Each hardware is mutually connected via a bus. The CPU 1601, the communication interface 1602, the ROM 1603, and the RAM 1604 are the same hardware as the CPU 101, the communication interface 102, the ROM 103, and the RAM 104. The ROM 1603 stores a program to realize a measurement unit 1710 (see FIG. 17).

Figure 17:
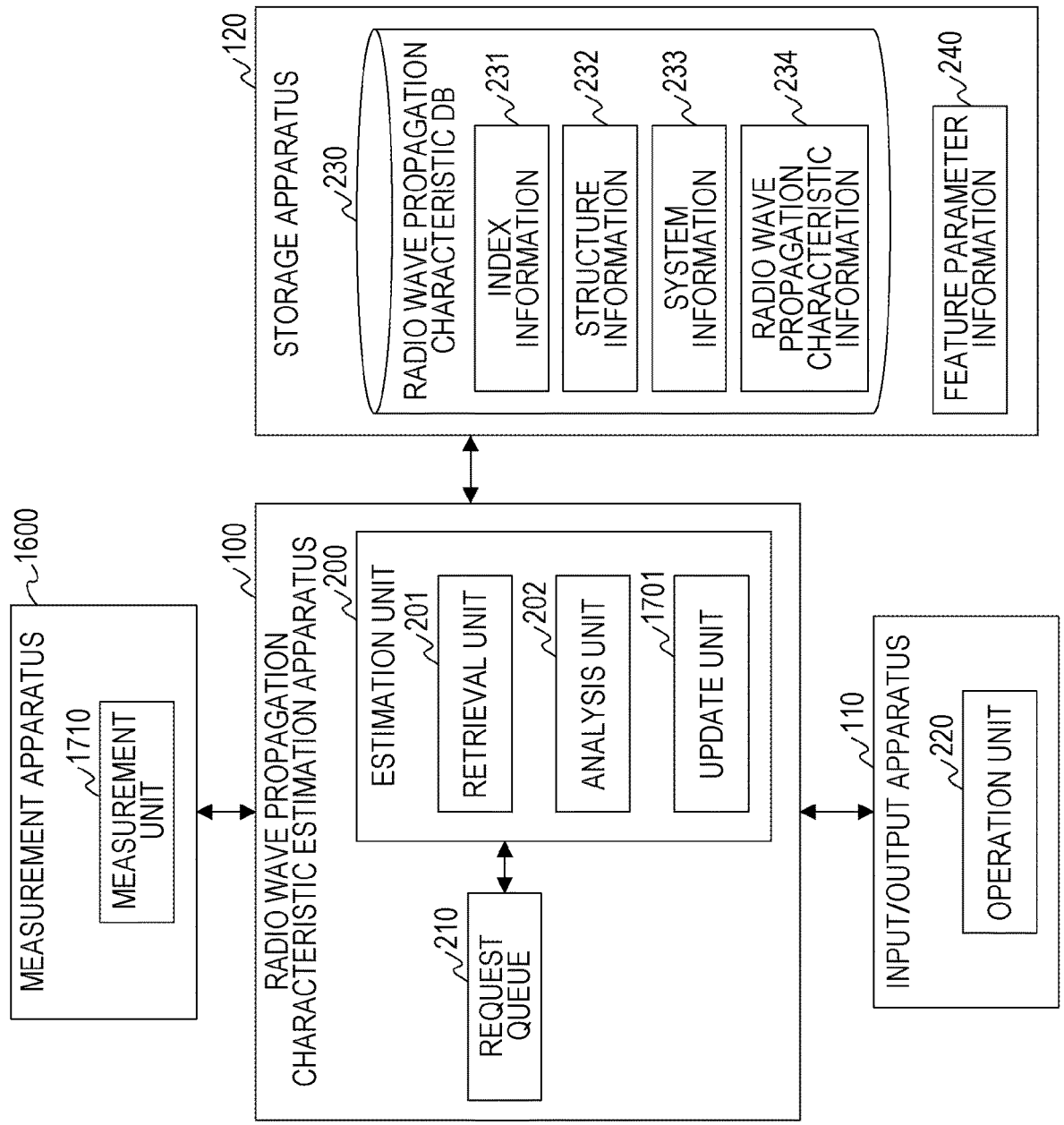
FIG. 17 is a diagram illustrating an example of a functional configuration of the radio wave propagation characteristic estimation system according to the third embodiment.

FIG. 17 is a diagram illustrating an example of a functional configuration of the radio wave propagation characteristic estimation system according to the third embodiment.

In the third embodiment, the estimation unit 200 includes an update unit 1700. Further, the measurement apparatus 1600 includes the measurement unit 1710. The other configurations are the same as those in the first embodiment.

The update unit 1700 updates the radio wave propagation characteristic DB 230. The radio wave propagation characteristic DB 230 is updated when a radio wave propagation characteristic estimation process is executed or when an update request is received from the measurement apparatus 1600.

The measurement unit 1710 performs measurement relating to a radio wave propagation characteristic to generate characteristic data. Structure data and system data are input to the measurement unit 1710 in advance. When the measurement is completed, the measurement unit 1710 transmits an update request including the structure data, system data, and characteristic data to the radio wave propagation characteristic estimation apparatus 100.

FIG. 18 is a flowchart illustrating the radio wave propagation characteristic estimation process executed by the radio wave propagation characteristic estimation apparatus 100 according to the third embodiment.

The processing from Step S201 to Step S206 is the same as that in the first embodiment. The estimation unit 200 updates the radio wave propagation characteristic DB 230 after the processing in Step S206 (Step S221), and then, ends the radio wave propagation characteristic estimation process. Specifically, the following processing is executed.

(Processing E1) The update unit 1700 adds an entry to the index information 231 and sets identification information in the ID 301 of the added entry. The update unit 1700 sets a name of estimation structure data in the structure data path 302 of the added entry, sets a name of estimation system data in the system data path 303, and sets a name of characteristic data acquired by a retrieval process in the characteristic data path 304.

(Processing E2) The update unit 1700 stores the estimation structure data in the structure information 232, and stores the estimation system data in the system information 233. The update unit 1700 stores the characteristic data acquired by the retrieval process in the radio wave propagation characteristic information 234.

Further, when index data corresponding to the estimation structure data and the estimation system data exists in the radio wave propagation characteristic DB 230, the update unit 1700 calculates an average value of characteristic data indicated by the index data and new characteristic data, and overwrites the existing characteristic data with a calculation result. In this case, the index information 231, the structure information 232, and the system information 233 are not updated. The processing in Step S221 has been described as above.

FIG. 19 is a flowchart illustrating a database update process executed by the radio wave propagation characteristic estimation apparatus 100 according to the third embodiment.

The radio wave propagation characteristic estimation apparatus 100 receives an update request from the measurement apparatus 1600 (Step S301). The received update request is accumulated in the request queue 210.

The update unit 1700 of the estimation unit 200 updates the radio wave propagation characteristic DB 230 based on structure data, system data, and characteristic data included in the update request (Step S302).

Specifically, the following processing is executed.

(Processing F1) The update unit 1700 adds an entry to the index information 231 and sets identification information in the ID 301 of the added entry. The update unit 1700 sets a name of estimation structure data in the structure data path 302 of the added entry, sets a name of estimation system data in the system data path 303, and sets a name of characteristic data in the characteristic data path 304.

(Processing F2) The update unit 1700 stores structure data in the structure information 232, stores system data in the system information 233, and stores data in the radio wave propagation characteristic information 234.

Further, when index data corresponding to the estimation structure data and the estimation system data exists in the radio wave propagation characteristic DB 230, the update unit 1700 calculates an average value of characteristic data indicated by the index data and new characteristic data, and overwrites the existing characteristic data with a calculation result. In this case, the index information 231, the structure information 232, and the system information 233 are not updated. The processing in Step S302 has been described as above.

According to the third embodiment, the radio wave propagation characteristic DB 230 can be updated. As a result, it is possible to resolve the shortage of the amount of data to be analyzed for generation of the feature parameter information 240.

Although the radio wave propagation characteristic estimation apparatus 100 includes the update unit 1700, an apparatus other than the radio wave propagation characteristic estimation apparatus 100 may include the update unit 1700. For example, it is conceivable to provide an update apparatus in the radio wave propagation characteristic estimation system.

Incidentally, the invention is not limited to the above-described embodiments and includes various modifications. Further, for example, the above-described embodiments have described the configurations in detail in order to describe the present invention in an easily understandable manner, and are not necessarily limited to those including the entire configuration that has been described above. Further, addition, deletion, or substitution of other configurations can be made with respect to some configurations of each embodiment.

Further, a part or all of each of the above-described configurations, functions, processing units, processing means, and the like may be realized, for example, by hardware by designing with an integrated circuit and the like. The present invention can also be realized by a program code of software realizing the functions of the embodiments. In this case, a storage medium in which the program code has been recorded is provided to a computer, and a processor included in the computer reads the program code stored in the storage medium. In this case, the program code itself read from the storage medium realizes the functions of the above-described embodiments, and the program code itself and the storage medium storing the program code constitute the present invention. As the storage medium configured to supply such a program code, for example, a flexible disk, a CD-ROM, a DVD-ROM, a hard disk, a solid state drive (SSD), an optical disk, a magneto-optical disk, CD-R, a magnetic tape, a nonvolatile memory card, a ROM, or the like is used.

Further, the program code realizing the functions described in the present embodiments can be implemented by a wide range of programs or script languages such as assembler, C/C++, perl, Shell, PHP, Python, and Java (registered trademark).

Further, the program code of the software realizing the functions of the embodiments may be distributed via a network such that the distributed program code is stored in storage means such as a hard disk and a memory of a computer or a storage medium such as CD-RW and CD-R, and a processor provided in the computer may read and execute the program code stored in the storage means or the storage medium.

In the above-described embodiments, control lines and information lines considered to be necessary for the description have been illustrated, and it is difficult to say that all of the control lines and information lines required as a product are illustrated. All the configurations may be connected to each other.

What is claimed is:

1. A computer system that estimates a radio wave propagation characteristic in a space where a wireless communication system using structure data and system data is constructed, the structure data configured using parameter values indicating a type and a structure characteristic of the space, the system data configured using a value relating to a design of the wireless communication system, the computer system comprising at least one computer that comprises a processor, a storage apparatus connected to the processor, and a communication device connected to the processor, wherein feature parameter information, which stores an entry that associates a parameter included in the structure data, that is, a feature parameter which greatly contributes to an estimation result of the radio wave propagation characteristic in the space with a type of the space, is held, wherein structure information storing the structure data, system information storing the system data, characteristic information storing characteristic data indicating the radio wave propagation characteristic in the space, and index information storing index data indicating an association among the structure data, the system data, and the characteristic data are held, and the processor acquires a type of a target space when receiving a request for estimation of a radio wave propagation characteristic in the target space, retrieves an entry associated with the type of the target space from the feature parameter information, presents a first interface to input a value of a feature parameter included in the retrieved entry as estimation structure data and a second interface to input estimation system data, estimates the radio wave propagation characteristic in the target space using the estimation structure data and the estimation system data, generates the feature parameter information by executing an analysis process to specify the feature parameter for each type of the space using an estimation model that estimates a radio wave propagation characteristic in a space based on the structure data and the system data, acquires the structure data in which a type of the space corresponds to a type of the target space, from the structure information when the estimation structure data and the estimation system data are input, refers to the index information to acquire the system data associated with the structure data, from the system information, refers to the index information to retrieve the characteristic data associated with a combination of the structure data similar to the estimation structure data and the system data similar to the estimation system data, compares the structure data acquired from the structure information and the estimation structure data to calculate a first similarity degree indicating a data similarity, compares the system data acquired from the system information and the estimation system data to calculate a second similarity degree indicating a data similarity, specifies the structure data similar to the estimation structure data from the acquired structure data based on a comparison result between the first similarity degree and a first threshold, specifies the system data similar to the estimation system data from the acquired system data based on a comparison result between the second similarity degree and a second threshold, and outputs the retrieved characteristic data as an estimation result of the radio wave propagation characteristic in the target space.

2. The computer system according to claim 1, wherein when the estimation structure data and the estimation system data are input, the processor processes the estimation structure data and the estimation system data based on the estimation model to calculate an estimation result of the radio wave propagation characteristic in the target space.

3. The computer system according to claim 1, wherein the processor generates the estimation model by executing a learning process using the structure information, the system information, and the characteristic information.

4. A method for estimating a radio wave propagation characteristic in a space where a wireless communication system using structure data and system data is constructed, the method to be executed by a computer system including at least one computer, the at least one computer including a processor, a storage apparatus connected to the processor, and a communication device connected to the processor, the structure data configured using parameter values indicating a type and a structure characteristic of the space, the system data configured using a value relating to a design of the wireless communication system, the computer system holding feature parameter information, which stores an entry that associates a parameter included in the structure data, that is, a feature parameter which greatly contributes to an estimation result of the radio wave propagation characteristic in the space with a type of the space, wherein the computer system holds structure information storing the structure data, system information storing the system data, characteristic information storing characteristic data indicating the radio wave propagation characteristic in the space, and index information storing index data indicating an association among the structure data, the system data, and the characteristic data, the method for estimating the radio wave propagation characteristic in the space comprising:

a first step of causing the processor to acquire a type of a target space when receiving a request for estimation of a radio wave propagation characteristic in the target space;

a second step of causing the processor to retrieve an entry associated with the type of the target space from the feature parameter information;

a third step of causing the processor to present a first interface to input a value of a feature parameter included in the retrieved entry as estimation structure data and a second interface to input estimation system data;

a fourth step of causing the processor to estimate the radio wave propagation characteristic in the target space using the estimation structure data and the estimation system data;

a step of causing the processor to generate the feature parameter information by executing an analysis process to specify the feature parameter for each type of the space using an estimation model that estimates a radio wave propagation characteristic in a space based on the structure data and the system data;

a fifth step of causing the processor to acquire the structure data in which a type of the space corresponds to a type of the target space, from the structure information when the estimation structure data and the estimation system data are input;

a sixth step of causing the processor to acquire the system data associated with the structure data, from the system information with reference to the index information;

a seventh step of causing the processor to retrieve the characteristic data associated with a combination of the structure data similar to the estimation structure data and the system data similar to the estimation system data with reference to the index information, wherein the seventh step further comprises a step of causing the processor to compare the structure data acquired from the structure information and the estimation structure data and calculate a first similarity degree indicating a data similarity, a step of causing the processor to compare the system data acquired from the system information and the estimation system data and calculate a second similarity degree indicating a data similarity, a step of causing the processor to specify the structure data similar to the estimation structure data from the acquired structure data based on a comparison result between the first similarity degree and a first threshold, and a step of causing the processor to specify the system data similar to the estimation system data from the acquired system data based on a comparison result between the second similarity degree and a second threshold; and an eighth step of causing the processor to output the retrieved characteristic data as an estimation result of the radio wave propagation characteristic in the target space.

5. The method for estimating the radio wave propagation characteristic in the space according to claim 4, wherein the fourth step comprises a step of causing the processor to process the estimation structure data and the estimation system data based on the estimation model to calculate an estimation result of the radio wave propagation characteristic in the target space when the estimation structure data and the estimation system data are input.

6. The method for estimating the radio wave propagation characteristic in the space according to claim 4, further comprising a step of causing the processor to generate the estimation model by executing a learning process using the structure information, the system information, and the characteristic information.

7. A computer that estimates a radio wave propagation characteristic in a space where a wireless communication system is constructed, the computer comprising:

a processor;

a storage apparatus connected to the processor;

a communication device connected to the processor; and an estimation unit that estimates the radio wave propagation characteristic in the space based on structure data configured using parameter values indicating a type and a structure characteristic of the space and system data configured using a value relating to a design of the wireless communication system, wherein feature parameter information, which stores an entry that associates a parameter included in the structure data, that is, a feature parameter which greatly contributes to an estimation result of the radio wave propagation characteristic in the space with a type of the space, is held, wherein structure information storing the structure data, system information storing the system data, characteristic information storing characteristic data indicating the radio wave propagation characteristic in the space, and index information storing index data indicating an association among the structure data, the system data, and the characteristic data are held, and the estimation unit acquires a type of a target space when receiving a request for estimation of a radio wave propagation characteristic in the target space, retrieves an entry associated with the type of the target space from the feature parameter information, presents a first interface to input a value of a feature parameter included in the retrieved entry as estimation structure data and a second interface to input estimation system data, estimates the radio wave propagation characteristic in the target space using the estimation structure data and the estimation system data, generates the feature parameter information by executing an analysis process to specify the feature parameter for each type of the space using an estimation model that estimates a radio wave propagation characteristic in a space based on the structure data and the system data, acquires the structure data in which a type of the space corresponds to a type of the target space, from the structure information when the estimation structure data and the estimation system data are input, refers to the index information to acquire the system data associated with the structure data, from the system information, refers to the index information to retrieve the characteristic data associated with a combination of the structure data similar to the estimation structure data and the system data similar to the estimation system data, compares the structure data acquired from the structure information and the estimation structure data to calculate a first similarity degree indicating a data similarity, compares the system data acquired from the system information and the estimation system data to calculate a second similarity degree indicating a data similarity, specifies the structure data similar to the estimation structure data from the acquired structure data based on a comparison result between the first similarity degree and a first threshold, specifies the system data similar to the estimation system data from the acquired system data based on a comparison result between the second similarity degree and a second threshold, and outputs the retrieved characteristic data as an estimation result of the radio wave propagation characteristic in the target space.

8. The computer system according to claim 2, wherein the processor generates the estimation model by executing a learning process using the structure information, the system information, and the characteristic information.

9. The method for estimating the radio wave propagation characteristic in the space according to claim 5, further comprising a step of causing the processor to generate the estimation model by executing a learning process using the structure information, the system information, and the characteristic information.

* * * * *